United States Patent
Suchowski et al.

(10) Patent No.: US 8,331,017 B2
(45) Date of Patent: Dec. 11, 2012

(54) CRYSTAL FOR OPTICAL CONVERSION

(75) Inventors: Haim Suchowski, Rehovot (IL); Yaron Silberberg, LeHavim (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 12/933,436

(22) PCT Filed: Mar. 25, 2009

(86) PCT No.: PCT/IL2009/000339
§ 371 (c)(1),
(2), (4) Date: Sep. 20, 2010

(87) PCT Pub. No.: WO2009/118738
PCT Pub. Date: Oct. 1, 2009

(65) Prior Publication Data
US 2011/0026103 A1    Feb. 3, 2011

Related U.S. Application Data

(60) Provisional application No. 61/064,759, filed on Mar. 25, 2008.

(51) Int. Cl.
G02F 2/02 (2006.01)
G02F 1/35 (2006.01)
(52) U.S. Cl. ......... 359/326; 359/330
(58) Field of Classification Search ..... 359/326–332
See application file for complete search history.

(56) References Cited

U.S. PATENT DOCUMENTS

| 5,640,405 | A | 6/1997 | Wallace et al. |
| 5,768,302 | A * | 6/1998 | Wallace et al. ............ 372/21 |
| 5,815,307 | A | 9/1998 | Arbore et al. |
| 6,726,763 | B2 * | 4/2004 | Lee et al. ............... 117/2 |
| 7,492,507 | B1 * | 2/2009 | Gollier ............ 359/326 |
| 7,940,451 | B2 * | 5/2011 | Asobe et al. ......... 359/328 |
| 2003/0084837 | A1 | 5/2003 | Lee et al. |
| 2010/0220384 | A1 * | 9/2010 | Kimura et al. ......... 359/328 |
| 2011/0043895 | A1 * | 2/2011 | Hikmet ............. 359/328 |

FOREIGN PATENT DOCUMENTS

| EP | 0576197 | 12/1993 |
| EP | 1372025 | 12/2003 |
| JP | 2000-321610 | 11/2000 |
| WO | WO 2009/118738 | 10/2009 |

OTHER PUBLICATIONS

Asobe et al. "Multiple Quasi-Phase-Matched LiNbO3 Wavelength Converter With a Continuously Phase-Modulated Domain Structure", Optics Letters, XP001160157, 28(7): 558-560, Apr. 1, 2003. Abstract.

(Continued)

*Primary Examiner* — Hemang Sanghavi

(57) ABSTRACT

An efficient broadband crystal for wavelength conversion, the crystal being a quasi-phase matched non-linear crystal, having an aperiodic poled structure, each period being tuned, and wherein said tuning varies adiabatically along a length of said crystal from a first end wherein said tuning is a strong negative mismatch to a second end wherein said tuning is a strong positive mismatch or vice versa. The crystal is able to provide efficient wavelength conversion over a range of frequencies.

21 Claims, 15 Drawing Sheets
(13 of 15 Drawing Sheet(s) Filed in Color)

OTHER PUBLICATIONS

International Search Report and the Written Opinion Dated Sep. 25, 2009 From the International Searching Authority Re.: Application No. PCT/IL2009/000339.

Arbore et al. "Engineerable Compression of Ultrashort Pulses by Use of Second-Harmonic Generation in Chirped-Period-Poled Lithium Niobate", Optics Letters, XP000720996, 22(17): 1341-1343, Sep. 1, 1997.

Das et al. "Broadening of the Phase-Matched Bandwidth in Quasi-Phase-Matched Second-Harmonic Generation Using GaN-Based Bragg Reflection Waveguide", Optics Letters, XP002541772, 32(21): 3128-3130, Nov. 1, 2007. Abstract.

Fejer et al. "Quasi-Phase-Matched Second Harmonic Generation: Tuning and Tolerances", IEEE Journal of Quanrum Electronics, XP000309655, 28(11): 2631-2654, Nov. 1, 1992.

Mizuuchi et al. "Broadening of the Phase-Matching Bandwidth in Quasi-Phase-Matched Second-Harmonic Generation", IEEE Journal of Quantum Electronics, XP000461408, 30(7): 1596-1604, Jul. 1, 1994.

Wu et al. "Broadening of the Second-Harmonic Phase-Matching Bandwidth in Type II Periodically Poled KTP", Applied Optics, XP002541773, 44(26): 5561-5564, Sep. 10, 2005. Abstract.

International Preliminary Report on Patentability Dated Oct. 7, 2010 From the International Bureau of WIPO Re. Application No. PCT/IL2009/000339.

Communication Pursuant to Article 94(3) EPC Dated Jun. 6, 2011 From the European Patent Office Re. Application No. 09724944.5.

Translation of Office Action Dated Mar. 31, 2012 From the State Intellectual Property Office of the People's Republic of China Re. Application No. 200980110317.8.

Lv et al. "Bandwidth and Stability Enhancement of Optical Parametric Amplification Using Chirped Ferroelectric Superlattice", Optics & Laser Technology, 40: 21-29, 2008.

* cited by examiner

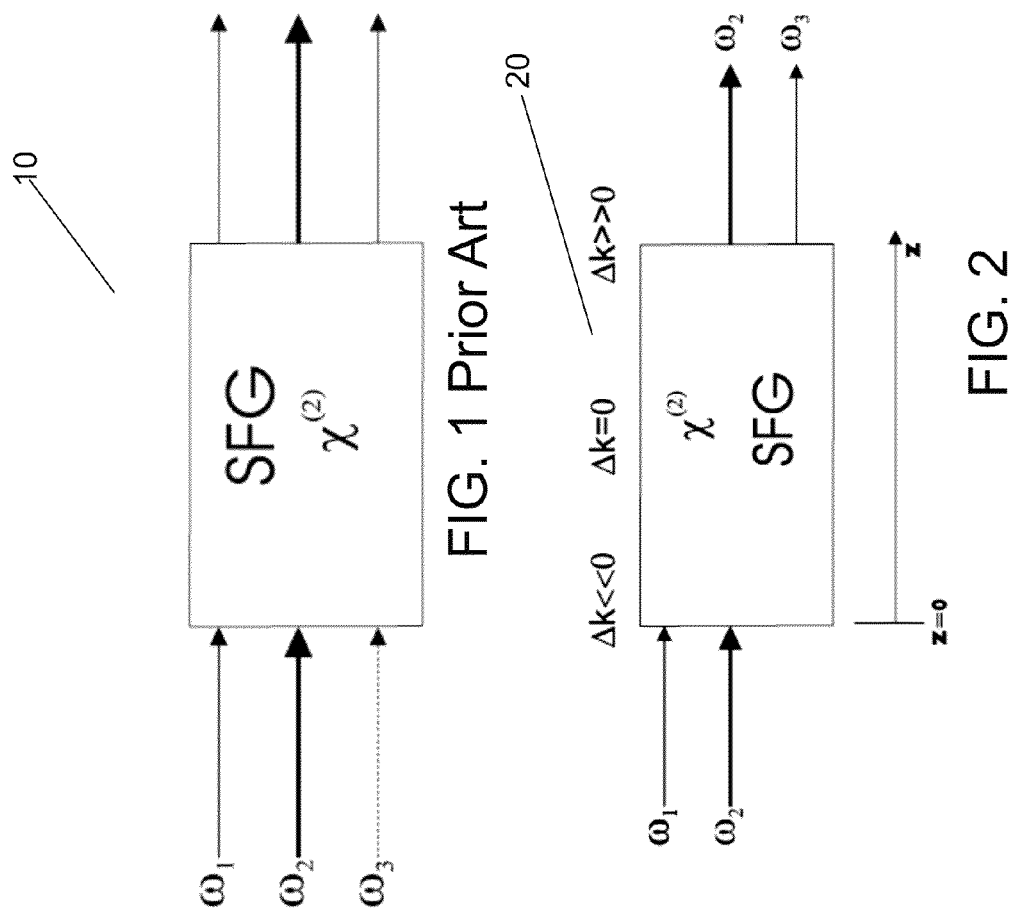

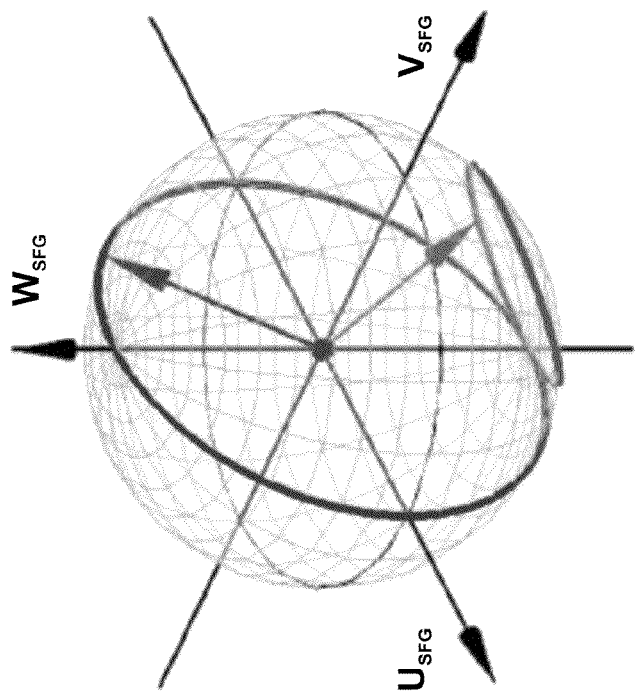
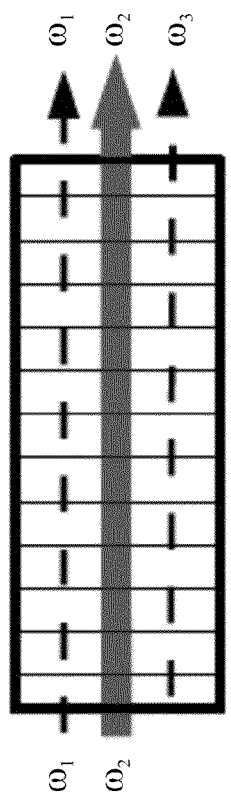
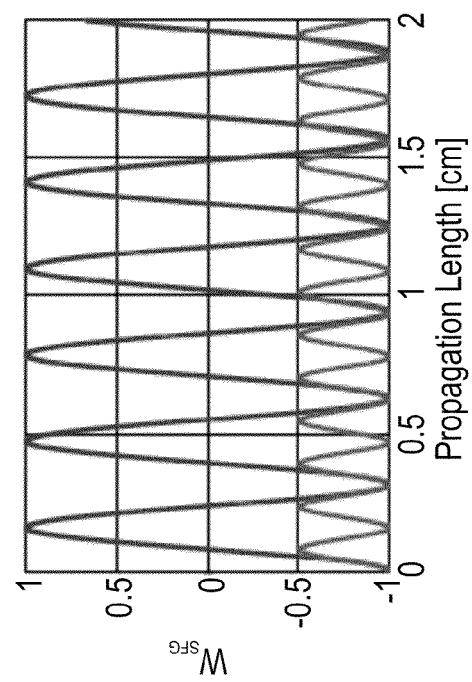
FIG. 10A
FIG. 10B
FIG. 10C

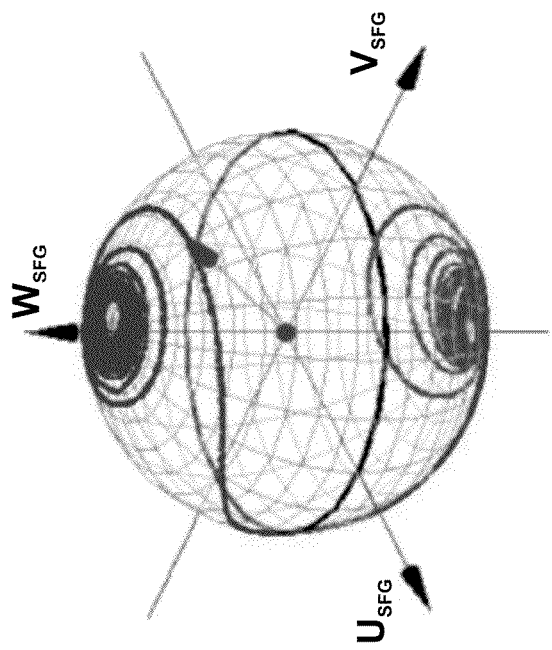
FIG. 11B
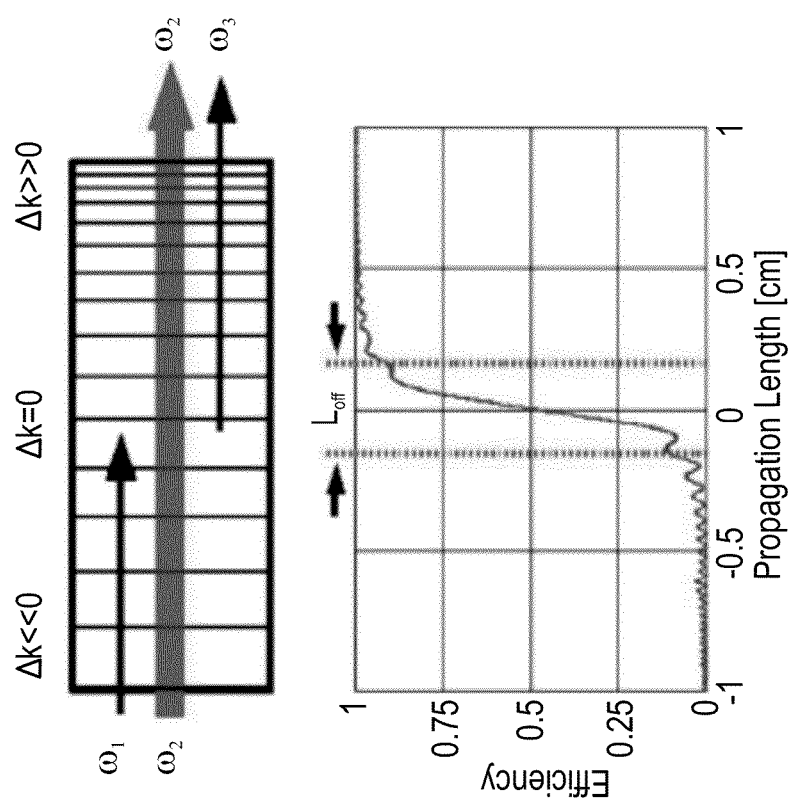
FIG. 11A
FIG. 11C

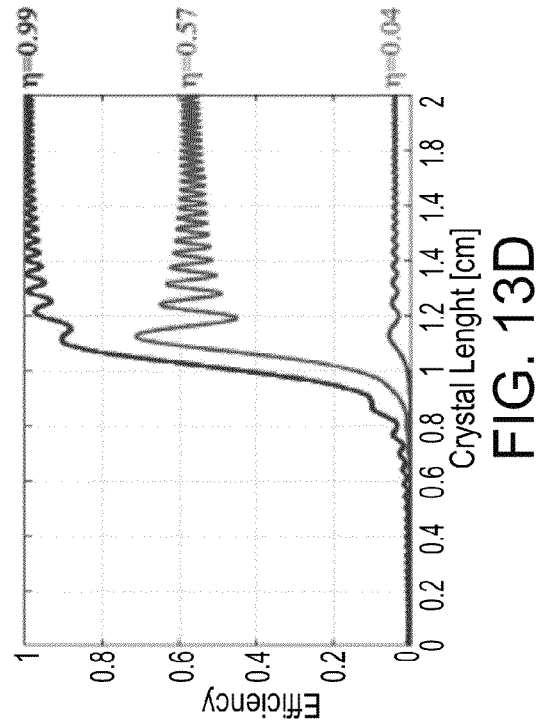
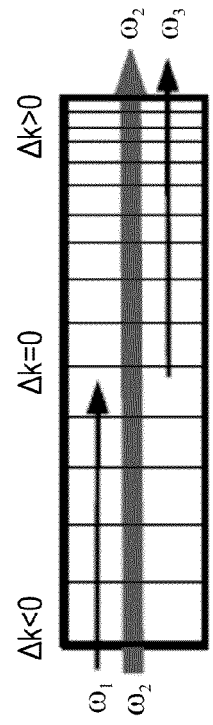
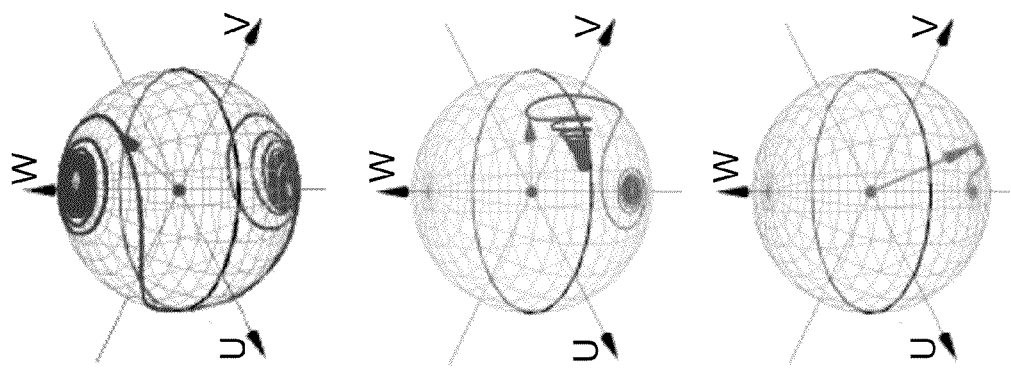
FIG. 13A  FIG. 13B  FIG. 13C  FIG. 13D  FIG. 13E

CRYSTAL FOR OPTICAL CONVERSION

RELATED APPLICATIONS

This Application is a National Phase of PCT Patent Application No. PCT/IL2009/000339 having International filing date of Mar. 25, 2009, which claims the benefit of U.S. Provisional Patent Application No. 61/064,759 filed on Mar. 25, 2008. The contents of the above Applications are all incorporated herein by reference.

FIELD AND BACKGROUND OF THE INVENTION

The present invention, in some embodiments thereof, relates to an optical frequency converter for use in optical conversion and, more particularly, but not exclusively, to efficient broadband optical conversion.

The generation of tunable frequency optical radiation typically relies on nonlinear frequency conversion in crystals. In this process, light of two frequencies or two colors is introduced into the nonlinear crystal, resulting in the generation of a third color with their sum or difference frequency. These processes, which also known as frequency up-conversion or frequency down-conversion are typically very sensitive to the incoming frequencies, in such a manner as to require angle, temperature or other tuning mechanisms in order to support efficient frequency conversion. This difficulty is of particular importance when trying to efficiently convert broadband frequency optical signals, since simultaneous phase matching of a broad frequency range is difficult.

Currently, most efficient frequency conversion devices rely on a single nonlinear crystal, which is either temperature or angle tuned to enhance efficiency. Typically, this results only in a narrow spectral band that is efficiently converted. Quasi-Phase Matching (QPM), in which a nonlinear crystal is modified periodically, results in improved efficiencies, but still within a narrow predetermined band. Segmented periodic structures [1] or aperiodic quasi phase matching [2] have been shown to improve the bandwidth response, but at a cost of a significantly reduced efficiency. Fejer and co-worker have used aperiodic QPM structures for chirp tuning of second harmonic generation (SHG) signal, generated by ultrashort pulses. They demonstrated that by using such a structure, not only is the SHG signal enhanced, but also the temporal chirp gain in the process can be controlled [3]. A recent structure, used by Baudrier-Raybaut and co-worker, was a totally disordered material (Random quasi-phase-matching), which lead to an extremely loose frequency selectivity and caused an inversion in a wide range of frequencies, though again it had a very low efficiency [4]. Thus broadband frequency conversion was achieved but with very low efficiency. To date as far as we know, broadband frequency converters have proven to be inefficient, and efficient converters are narrowband. The combination of broadband and efficient conversion is currently not known.

Additional background art includes

[1] K. Mizuuchi, K. Yamamoto, M. Kato, and H. Sato *Broadening of the Phase-Matching Bandwidth in Quasi-Phased-Matched Second Harmonic Generation*, IEEE Journal of Quantum Electronics 30 (7), 15961604 (1994).

[2] M. M. Fejer, G. A. Magel, D. H. Jundt, and R. L. Byer, *Quasi-Phase-Matched Second Harmonic Generation: Tuning and Tolerances*, IEEE Journal of Quantum Electronics 28 (11), 2631-2654 (1992); M. L. Bortz, M. Fujimura, and M. M. Fejer, *Increased acceptance bandwidth for quasi-phasematched second harmonic generation in LiNbO3 waveguides*, Electronics Letters 30 (1), 34-35 (1994).

[3] M. A. Arbore, A. Galvanauskas, D. Harter, M. H. Chou, and M. M. Fejer, *Engineerable compression of ultrashort pulses by use of second-harmonic generation in chirped-period-poled lithium niobate*, Optics Letters 22 (17), 13411343 (1997).

[4] M. Baudrier-Raybaut, R. Haidar, Ph. Kupecek, Ph. Lemasson, and E. Rosencher, *Random quasi phase matching in bulk polycrystalline isotropic nonlinear materials*, Nature 432 (7015), 374-376 (2004).

[5] R. W. Boyd, *Nonlinear Optics* (Academic Press, 2005) pages 79-83.

[6] A. Messiah, *Quantum Mechanics* Vol. II (Wiley, 1963) pages 739-759.

SUMMARY OF THE INVENTION

The present embodiments are intended to provide efficient broadband frequency conversion. A strong pump laser intensity is used and the crystal has an adiabatic structure, as will be explained below.

One way of providing an adiabatic structure is to modify the QPM crystal structure through a gradual change in the tuning characteristics along the crystal. As will be shown, the result is efficient frequency conversion over a broad frequency range. As well as QPM, any other technique that accomplishes adiabatic change of the phase mismatch parameter along the crystal is also encompassed.

According to one aspect of the present invention there is provided a crystal for wavelength conversion, the crystal having a longitudinal dimension between a first end and a second end and having a periodic pole structure comprising a plurality of tuned periods, wherein tuning of respective periods varies adiabatically along said longitudinal dimension from said first end to said second end.

The crystal may comprise a quasi-phase matched crystal.

The crystal may be configured to be used with a laser pump beam at an intensity sufficient to allow the undepleted pump approximation to apply.

In an embodiment, said tuning is a strong negative mismatch to an incoming light frequency for conversion at said first end and a strong positive mismatch to said frequency at said second end.

In an embodiment, said tuning is a strong positive mismatch to an incoming light frequency at said first end and a strong negative mismatch to said frequency at said second end.

In an embodiment, said adiabatic variation is continuously incremental along said dimension.

In an embodiment, each period has a period length within an order of magnitude of a wavelength of light of interest.

The crystal may have a length along said longitudinal dimension of substantially seven orders of magnitude of said wavelength.

The crystal may be such as to provide to incident light a group of periods with a first tuning, followed by succeeding groups each with marginal changes in said tuning compared to a respective preceding group. Alternatively each period may be slightly offset from its predecessor. Typically the alternative chosen depends on manufacturing tolerances and what is the smallest possible increment it is possible to manufacture.

In an embodiment, said tuning is provided as a length of a respective period.

According to a second aspect of the present invention there is provided, apparatus for efficient broadband wavelength conversion comprising:

a quasi-phase matched non-linear crystal having a period tuned adiabatically over a length of said crystal, a coherent source input for receiving source light at an input frequency within a frequency range, a pump laser input for receiving laser light at a predetermined pump frequency, and an output for outputting light at an output frequency, said output frequency being a function of said input frequency and said pump frequency.

In an embodiment, said function comprises a summation function.

In an embodiment, said function comprises a difference function.

In an embodiment, said pump laser input provides laser light at an intensity substantially high enough to justify the undepleted pump approximation.

The pump laser may provide light over a relatively narrow frequency range.

According to a third aspect of the present invention there is provided a method of manufacturing a crystal for wavelength conversion comprising:

growing said crystal with a progression of layers of oppositely polarized regions;

gradually changing a thickness of said layers during progression, thereby to form a quasi-matched non-linear crystal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The Patent or application file contains at least one drawing executed in color. Copies of this patent or patent application publication with color drawing(s) will be provided by the office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 1 is a simplified schematic diagram showing a crystal designed for a conventional sum frequency generation (SFG) process for frequency shifting;

FIG. 2 is a simplified schematic diagram showing a crystal with an adiabatic structure according to a first preferred embodiment of the present invention;

FIG. 10A-C are simplified schematic diagrams illustrating the case of full energy transfer from signal to idler—SFG or upconversion according to the present embodiments, in which FIG. 10A shows the crystal, FIG. 10B shows the dynamics mapped onto a Bloch sphere and FIG. 10C shows mapping of the dynamics onto the z axis to yield the conversion efficiency;

FIG. 11A-C are simplified schematic diagrams showing full energy transfer from signal to idler in the adiabatic case, in which FIG. 11A shows continuous adiabatic variation on the phase mismatch parameter; FIG. 11B shows projection onto a Bloch sphere and FIG. 11C shows projection onto the z-axis;

FIG. 13A, B and C are schematic Bloch spheres with trajectories for three different laser intensities, 440, 80 and 4 MW/cm$^2$ respectively for signal to idler or upconversion, FIG. 13D is a graph illustrating projection of the three respective trajectories onto the z axis to yield conversion efficiency and FIG. 13e illustrates a crystal that may achieve the result using continuous adiabatic conversion of the phase mismatch parameter, in this case slowly changing the poling periodicity along the propagation direction;

DESCRIPTION OF EMBODIMENTS OF THE INVENTION

Figure 3:
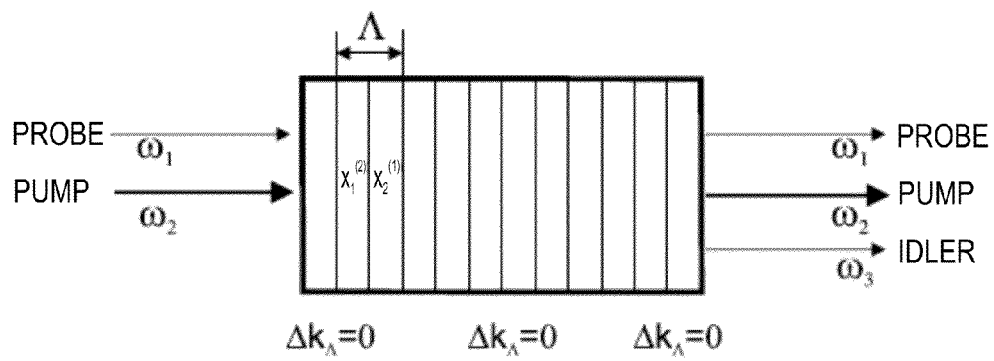
FIG. 3 is a simplified diagram showing schematically a periodically poled crystal designed to cause an effective phase matching close to zero along the propagation direction in the crystal.

The present invention, in some embodiments thereof, relates to a crystal for use in optical conversion and, more particularly, but not exclusively to efficient broadband optical conversion.

Efficient broadband frequency conversion is achieved via using a strong pump intensity and an adiabatic crystal structure.

Quasi-phase matching is an efficient crystal structure for achieving adiabatic changes since the structure has periods which can be modified to range over a series of phase mismatches from a highly negative to a highly positive mismatch for increasing or decreasing the frequency. Modifying the crystal structure from highly positive to highly negative mismatch may achieve the desired up-conversion/down-conversion.

As mentioned, the present embodiments modify the QPM crystal structure through a gradual change in the tuning characteristics along the crystal. As will be shown, the result is efficient frequency conversion over a broad frequency range.

The present embodiments modify the QPM crystal structure through a gradual change in the tuning characteristics along the crystal. As will be shown, the result is efficient frequency conversion over a broad frequency range.

In the following, a technique is provided to achieve both efficiency and broadband. The device to be described may obtain an efficient ultra-broadband wavelength conversion based on a method of adiabatic change of the phased matching value which is described below. The device works in a regime where a strong narrow-band pump is introduced into the crystal, along with a weaker pulse which is to be converted. The above may be treated using an approximation known as the Undepleted Pump approximation. This adiabatic structure, according to the design conditions to be provided below, may lead to ultrabroad, efficient and robust frequency conversion. The structure may achieve full or efficient population transfer of energy from the probe signal to the idler component or vice versa, not effecting the pump at all. Such a way to perform frequency conversion is realized by a quasi-phase matched nonlinear crystal whose period is tuned adiabatically from strong negative phase mismatch to strong positive phase mismatch along the length of the crystal. The phase mismatch may also range from strong positive to strong negative. Both structures suitable for increasing frequency and or decreasing frequency. Such a device has the capability to efficiently transfer the weaker pulse, whether via upconversion or via downconversion, as long as its entire bandwidth satisfies the adiabaticity conditions and the pump is strong and narrow. One possible realization of this device can be an adiabatic chirped periodically poled structure, also known as CPPLN. In this manner, the conversion process can reach 90% efficiency (idler/signal power) for a bandwidth spanning more than an octave in the visible-NIR region. As such, the device can be utilized for efficient frequency conversion of broadband signals as well as ultrashort pulses.

Another advantage of embodiments of the device as compared with current technology is relative insensitivity to crystal temperature, pump intensity and deviations in alignment, such as the angle of incidence of the incoming beams.

Figure 17A:
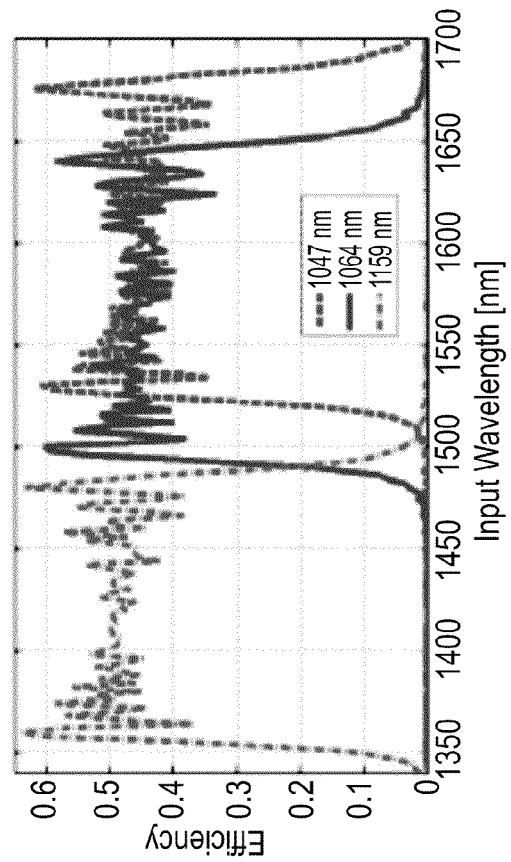
FIG. 17A illustrates experimental results of temperature tunability according to embodiments of the present invention, in which conversion efficiency peaks are significantly shifted when the temperature is shifted between 50 and 110° C.
Figure 17B:
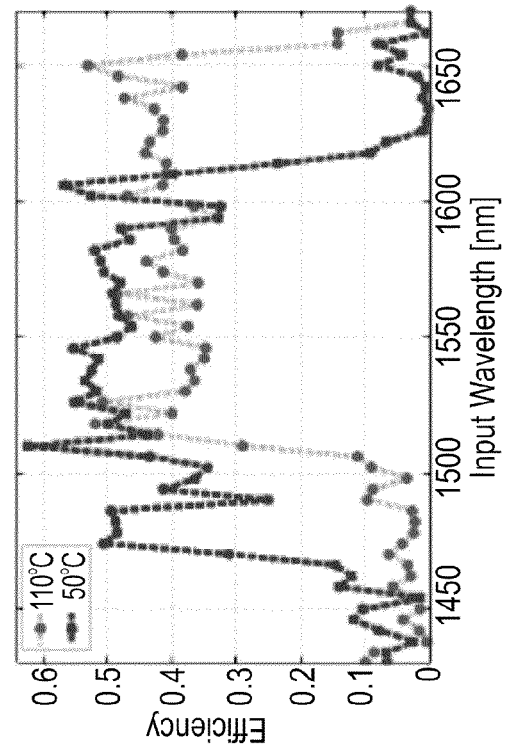
FIG. 17B illustrates tunability by varying the pump wavelength, in this case efficiency curves for 1047 nm, 1064 nm and 1159 nm are seen to be significantly offset.

Due to the relative insensitivity to pump frequency it is possible to deliberately change the pump frequency in order to achieve different conversions, as will be explained in greater detail below. Specifically, experimental data below in respect of FIGS. 17a and 17b show how pump frequency and temperature can be used in tuning.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

SFG in the Undepleted Pump Approximation

Reference is now made to FIG. 1, which illustrates crystal 10 designed for a conventional sum frequency generation (SFG) process. Light of two frequencies is introduced into the nonlinear crystal 10, resulting in the generation of a third color with their sum frequency. The figure illustrates Sum Frequency Generation in the Undepleted Pump approximation. The undepleted pump approximation is the case where one of the incoming field, is much stronger then the other incoming field. The amplitude of $\omega_2$ (bold arrow) is much larger than the amplitudes $\omega_1$, $\omega_3$. The output beams are $\omega_1$, $\omega_2$ and the SFG signal $\omega_3$. In this process a weak input beam in $\omega_3$ (dashed line) can also be considered.

This stronger frequency is referred to as the pump frequency and in the following we choose the pump to be $\omega_2$. The amplitude remains constant along the propagation direction within the crystal, i.e.

$$A_2(z=0) \gg A_1(z=0) \tag{1}$$

$$A_2(z) \approx A_2(z=0) \tag{2}$$

By defining the following quantities [5]:

$$K_1 = \frac{4\pi i \omega_1^2 \chi^{(2)}}{k_1 c^2} A_2^*$$

$$K_3 = \frac{4\pi i \omega_3^2 \chi^{(2)}}{k_3 c^2} A_2$$

$$\kappa = \frac{i}{2} \sqrt{K_1 K_3}$$

where $\omega_1$ and $\omega_3$ are the frequencies of the signal and idler respectively, $k_1$ and $k_3$ are their associated wave numbers, c is the speed of light in vacuum, $A_2$ is the amplitude of the pump, and $\chi^{(2)}$ is the second order susceptibility of the crystal.

Using normalized amplitudes $\tilde{A}_1 = A_1/\sqrt{K_1}$ and $\tilde{A}_3 = A_3/\sqrt{K_3}$, will lead to the following coupled equations:

$$\frac{d\tilde{A}_1}{dz} = i\kappa \tilde{A}_3 e^{-i\Delta k z} \tag{3}$$

$$\frac{d\tilde{A}_3}{dz} = i\kappa \tilde{A}_1 e^{+i\Delta k z} \tag{4}$$

where $\Delta k$ is the phase mismatch value, and z is the position in the crystal along the optical axis. In the case of perfect phase matching, one can achieve full energy transfer, at the length determined by $\kappa \cdot z = \pi$, whereas in a constant phase mismatch all along the crystal, the process will be always inefficient.

The Adiabatic Inversion

Achieving full energy transfer in up-conversion of two incoming frequencies is usually not robust. Rather such up-conversion requires several important ingredients to be satisfied simultaneously: perfect phase matching, specific pump intensity, and specific crystal length. Deviation from those predetermined parameters leads to rapid decrease of efficiency. The decrease in efficiency is mainly due to dependence of the parameter in the incoming frequencies and the intensity of the pump.

In the following, a mechanism is borrowed from NMR and atom-photon interaction fields of research, in order to achieve full energy transfer from $A_1(z)$ to $A_3(z)$, that is from amplitudes of the signal and idler along the propagation direction.

Reference is now made to FIG. 2 which illustrates an adiabatic inversion scheme in an SFG process with the undepleted pump approximation, according to a first embodiment of the present invention. In contrast with the conventional requirement of perfect phase matching along the crystal, here continuous adiabatic variation of phase mismatch is provided. Crystal 20 has a length dimension Z and tuning conditions along the Z dimension of the crystal vary from very negative to very positive. That is to say, crystal 20 is a quasi-phase matched non-linear crystal, having a longitudinal dimension and having a periodic pole structure comprising a plurality of tuned periods. Tuning of the respective periods varies adiabatically, meaning gradually, along the longitudinal dimension of the crystal. What constitutes adiabatic may be determined by equation 7 below. In addition the use of a strong, that is high intensity pump, is required. The required intensity level is defined by equations 1-7, and is the level at which the undepleted pump approximation applies.

Herein, the term "adiabatic" or "adiabatically" takes its meaning from quantum physics, and refers to the ability of the crystal to set up a quantum mechanical system with the light beams, in which the crystal structure presents to the light beams gradually changing conditions, allowing the system to change its functional form. That is to say, an adiabatic change comprises a change that is sufficiently gradual as to retain an eigenstate of the optical system. This is in contrast with the prior art, where the prior art crystals provided rapidly varying conditions in which there was no time for the functional form of the state (of the quantum mechanical system) to adapt, so that the system remained in its original state. That is to say what the present inventors have discovered is that a gradual change in conditions allows the quantum dynamic state to remain stable and respond to the changing conditions. Rapid change by contrast gets ignored.

The phase mismatch, $\Delta k(z)$ may change adiabatically from a big negative value, or vice versa, as an analogy to the way in which a red detuned field interacts with a two level system, to a big positive value, as an analogy to the blue detuned field.

The concept of the adiabatic process is now considered in greater detail. For a wave process to be considered adiabatic, the following conditions may be satisfied:

$$|\Delta k| \gg \kappa \tag{5}$$

$$\Delta k(z = 0) \ll 0, \tag{6}$$
$$\Delta k(z = z_{end}) \gg 0 \text{ (or vice versa)}$$

$$\left|\frac{d\Delta k}{dz}\right| \ll \frac{(\Delta k^2 + \kappa^2)^{3/2}}{\kappa} \tag{7}$$

The first two conditions, deal with the magnitude value of the phase mismatch parameter, which may be very large in comparison to the value of the coupling coefficient, and it has to start the interaction with a large negative (or positive) value of phase mismatch, and end with a large positive (or negative) value. The third condition is the most acute one, which deals with the rate of the phase mismatch change during the propagation. To satisfy this condition, the structure may be changed adiabatically (very slowly) compared to the internal propagation length of the nonlinear process. Another observation is that the same device can be used for both up-conversion and for a down-conversion (DFG) process, where in the down-conversion case, full energy transfer from $A_3(z)$ to $A_1(z)$ may occur. This idea is demonstrated visually in FIG. 4(b) discussed below.

Implementing Adiabatic Structure using QPM

Quasi Phased Matching is a technique in nonlinear optics which allows a transfer of energy from pump frequency to signal and idler frequencies. It offers several advantages over other phase matching techniques, such as the fact that all optical frequencies involved are collinear with each other and all the optical frequencies can have the same polarization, which allows for the access to the largest nonlinear coefficient of the crystal, $d_{33}$.

The most commonly used technique for creating quasi-phase-matched crystals is periodic poling. Many phase-sensitive nonlinear processes, in particular parametric processes such as frequency doubling, sum and difference frequency generation, parametric amplification, and four-wave mixing, require phase matching to be efficient. Phase matching means that a proper phase relationship between the interacting waves (for optimum nonlinear frequency conversion) is maintained along the propagation direction. This technique not only achieves a phase mismatch which is close to zero along the propagation axis, but almost any desired function of the phased mismatched parameter. All one need to do is firstly to calculate the phased matching of the process, which is in the case of SFG, $$\Delta k_{proc}(z) = k_1(z) + k_2(z) - k_3(z) \tag{8}$$

then secondly to design a suitable $\Delta k_\Lambda(z)$, to achieve an effective phased mismatch function, $$\Delta k_{eff}(z) = \Delta k_{proc}(z) + \Delta k_\Lambda(z) \tag{9}$$

The value of the phase mismatching achieved by the quasi phase matching technique is as follows:

$$\Delta k_\Lambda(z) = \frac{2\pi}{\Lambda(z)} \tag{10}$$

Reference is now made to FIG. 3 which shows schematically a periodically poled crystal designed to cause an effective phase matching close to zero along the propagation direction in the crystal; i.e. $\Delta k_{eff} = \Delta k_{eff} - 2\pi/\Lambda(z) = 0$. A value of $\Lambda$ is chosen to satisfy the condition for phase matching for specific $\omega_1$ and $\omega_2$; Different frequencies may lead to a decrease in efficiency.

Figure 5:
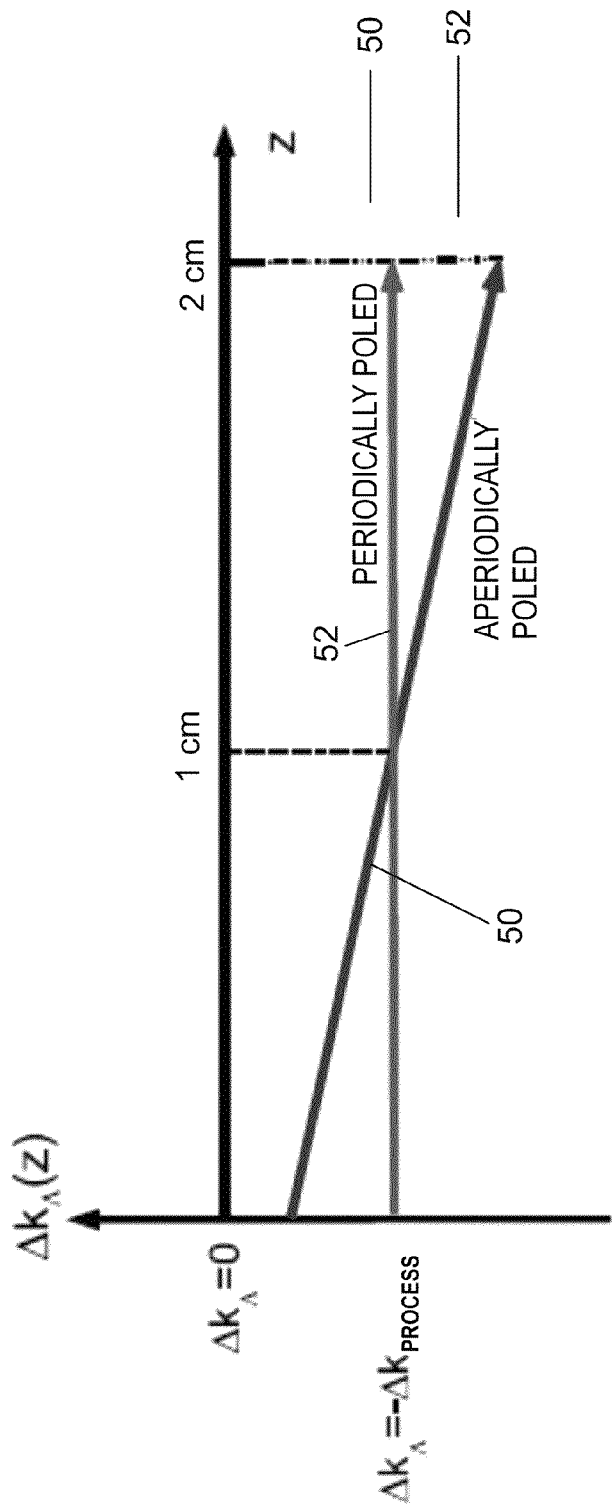
FIG. 5 is a simplified graph showing phase differences along the length of the crystal for the periodically and aperiodically poled crystal cases.

Reference is now made to FIG. 5, in which two examples of a periodic poling function are demonstrated. A constant function 50, that leads to a periodically poled structure, is designed to achieve perfect phase matching along all the propagation length. A linear function 52 by contrast causes a variation of the phase mismatch along the propagation length. That is to say, in FIG. 5, effective phase mismatch values along the propagation axis are demonstrated. The constant function 50 which leads to a periodically poled structure is designed to achieve perfect phase matching along all the propagation length, whereas the linear function 52 causes a variation of the phase mismatch along the propagation length. It should be noted the same effect would occur with an inverse variation of the phase mismatch.

Figure 4A:
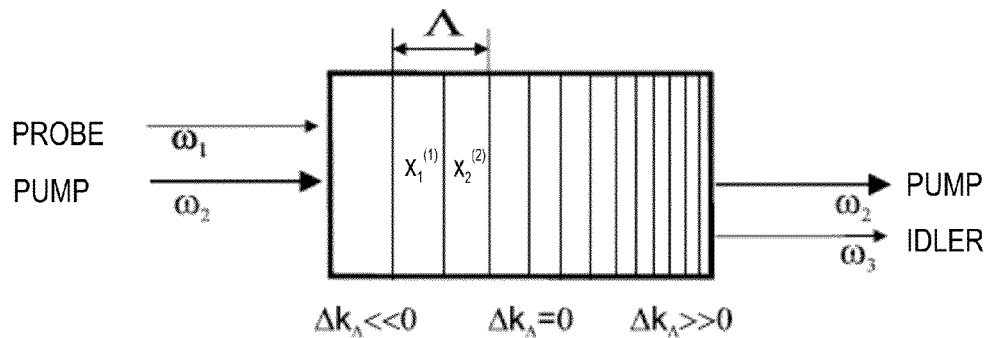
FIG. 4A is a schematic diagram of an aperiodically poled crystal being used for Sum Frequency Generation process.
Figure 4B:
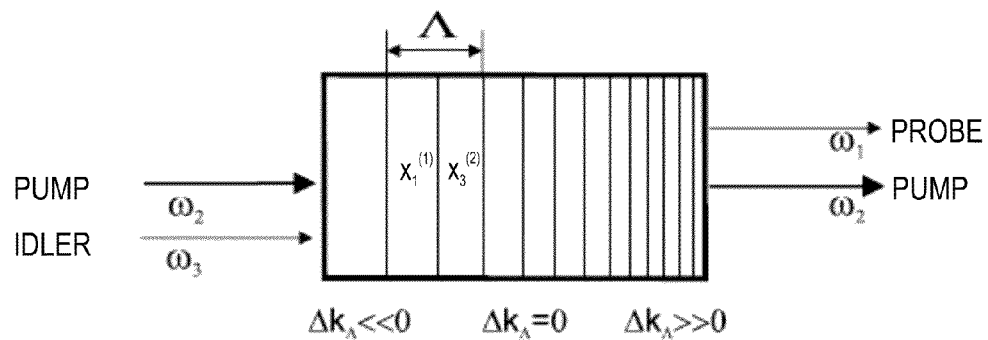
FIG. 4B is a schematic diagram of an aperiodically poled crystal being used in a Difference Frequency Generation process.

FIGS. 4A and 4B show an aperiodically poled crystal ($LiNbO_3$ or KTP) with a decreasing Λ. The crystal has gradual changes in its tuning, for which the term "chirp" may be used. This chirped crystal can be use either to perform efficient broadband SFG shown in (a), that is to say summation, or efficient broadband DFG shown in (b), that is to say producing a difference and ending with a lower frequency.

Simulations

To demonstrate the advantages of the adiabatic structure, several sets of simulations were performed. The conventional periodically poled (perfect phased matched) structure is now compared with the adiabatic design of the present embodiments. The following simulates the process with a narrow strong pump in, $\lambda_2=1.064$ μm, and a broad overall signal range $\lambda_1=1.5$ μm to $\lambda_1=1.6$ μm. The periodically poled structure is designed to achieve perfect phase matching to a signal wavelength with $\lambda_1=1.55$ μm at θ=0 deg. The adiabatic structure is designed to fulfill all the constraints of Equations 5, and FIG. 5 shows the slope of ΔK. If the crystal is periodically poled, with constant periods then ΔK is flat, graph 52. If ΔK is aperiodic then there is a slope. If the change is in an adiabatic manner (adiabatic linear change)—then graph 50 is obtained. If the structure varies but not in an adiabatic way then ΔK appears as graph 54. The comparison concentrates on the following parameters:

Signal wavelength comparison.
Angle of incidence comparison.
Pump intensity comparison.
Pump frequency comparison.

The length of the crystal was chosen to be L=20 mm. In each comparison the end result is also checked when the length of the crystal is shortened to L=19 mm, which is a variation of 5%. Also the pump intensity was chosen to be $I_2=110$ MW/cm². All the simulations were performed in a KTP nonlinear crystal with $\chi^{(2)}=16$ pm/V.

Signal Wavelength Parameter

Figure 6A:
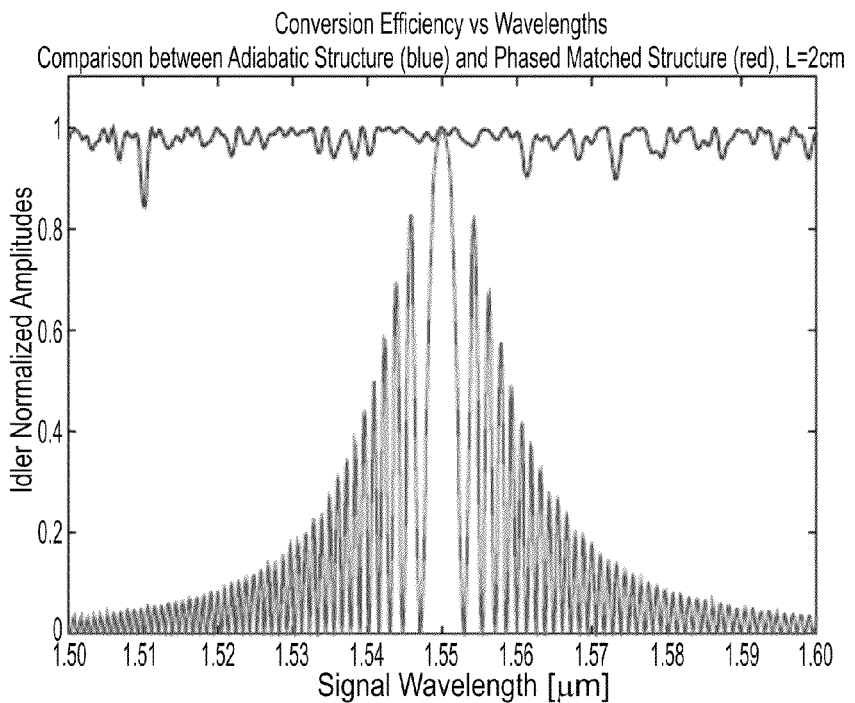
FIGS. 6A and 6B are a simplified graphs for two crystal lengths respectively, showing efficiency of the frequency conversion process over a range of input frequencies for the periodic and adiabatic aperiodic cases.

FIG. 6(a) shows a comparison between the periodically poled structure in the lower graph with the adiabatic structure in the upper graph. It can be seen that while the periodically poled structure is efficient only in a narrow regime of 2 nm, (efficiency over 90% occurs between the wavelengths $\lambda_1=1.549$ μm and $\lambda_1=1.551$ μm), the efficiency of the adiabatic structure is above 90% over more than 100 nm. More specifically efficiency is shown over a range of approximately 140 nm, between $\lambda_1=1.48$ μm and $\lambda_1=1.62$ μm.

Figure 6B:
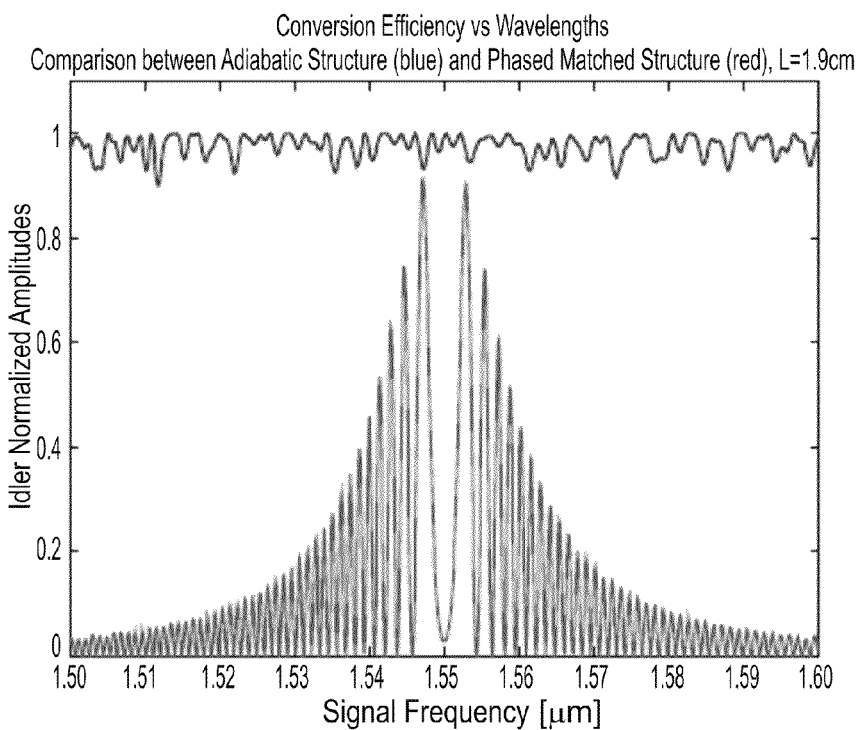

When we check the robustness of the same structure, but with different length (19 mm instead of 20 mm), we see in FIG. 6(b) that the efficiency in the periodically poled structure drops almost to zero, whereas in the adiabatic structure the efficiency remains as before.

That is to say, efficiency above 90% is achieved only for a bandwidth of 2 nm in the periodically poled structure, whereas in the adiabatic structure, efficient broadband converter is achieved over a range of more than 140 nm. This broadband efficiency does not drop even if the length of the crystal is varied as shown in (b).

Angle Parameters

Figure 7A:
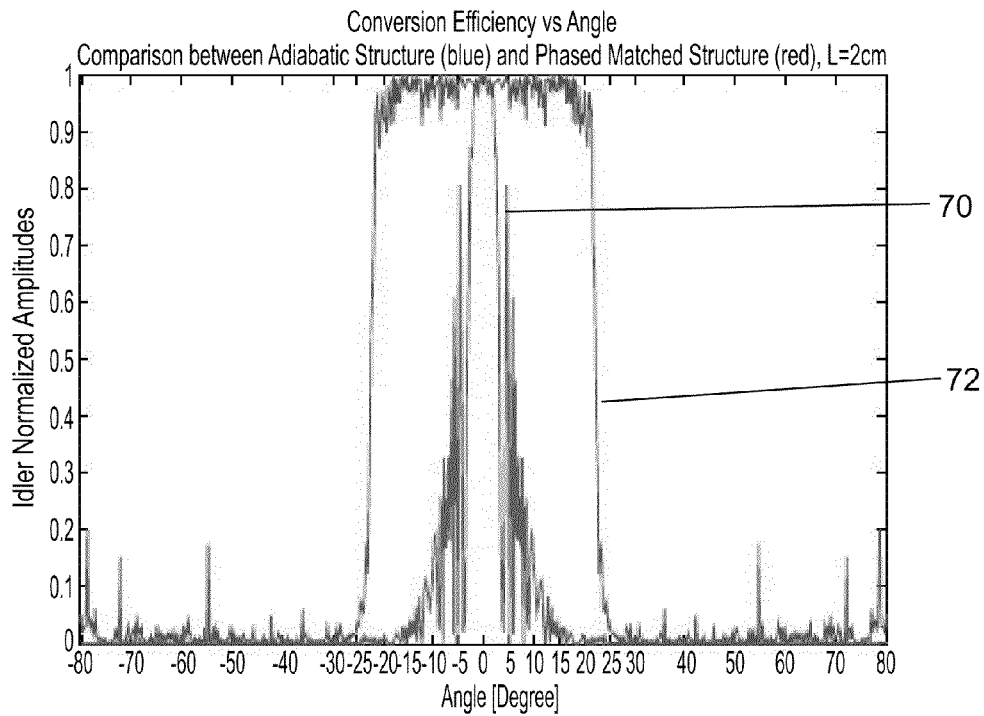
FIGS. 7A and 7B are simplified graphs for two crystal lengths respectively, showing efficiency of the frequency conversion process over a range of input angles for the periodic and adiabatic aperiodic cases.

Reference is now made to FIG. 7(a), which shows a comparison between the periodically poled structure 70 and the adiabatic structure 72. It can be seen that while the periodically poled structure is efficient only in a narrow angle of incidence of ±5°, (efficiency over 90%), the efficiency in the adiabatic structure is above 90% over more than ±25°.

Figure 7B:
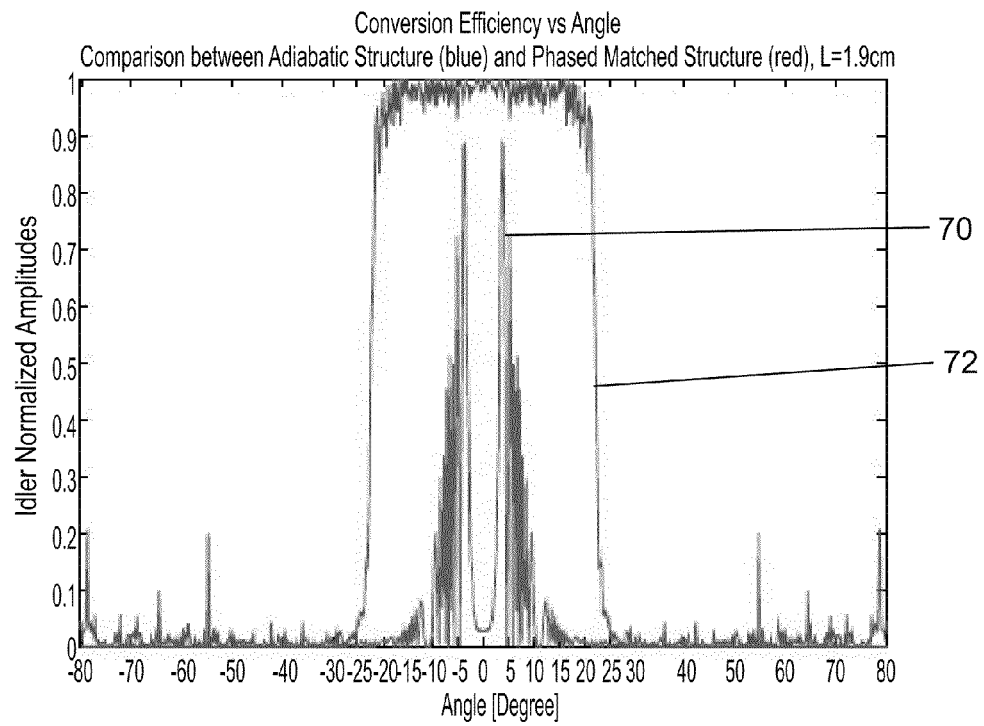

Referring now to FIG. 7b, when we check the robustness of the same structure, but with different length (19 mm instead of 20 mm), we see that the efficiency in the periodically poled structure dropped almost to zero, whereas in the adiabatic structure it remains as before.

That is to say FIGS. 7a and 7b show a comparison between the periodically poled structure 70 and the adiabatic structure 72 for a crystal length of (a) 20 mm (b) 19 mm, for angle of incidence. Efficiency above 90% is achieved only for bandwidths of ±5° in the periodically poled structure, whereas in the adiabatic structure, efficient broadband converter is achieved for ±25°. This broadband efficiency does not drop even if the length of the crystal is varied as shown in (b).

Pump Intensity Parameter

Figure 8A:
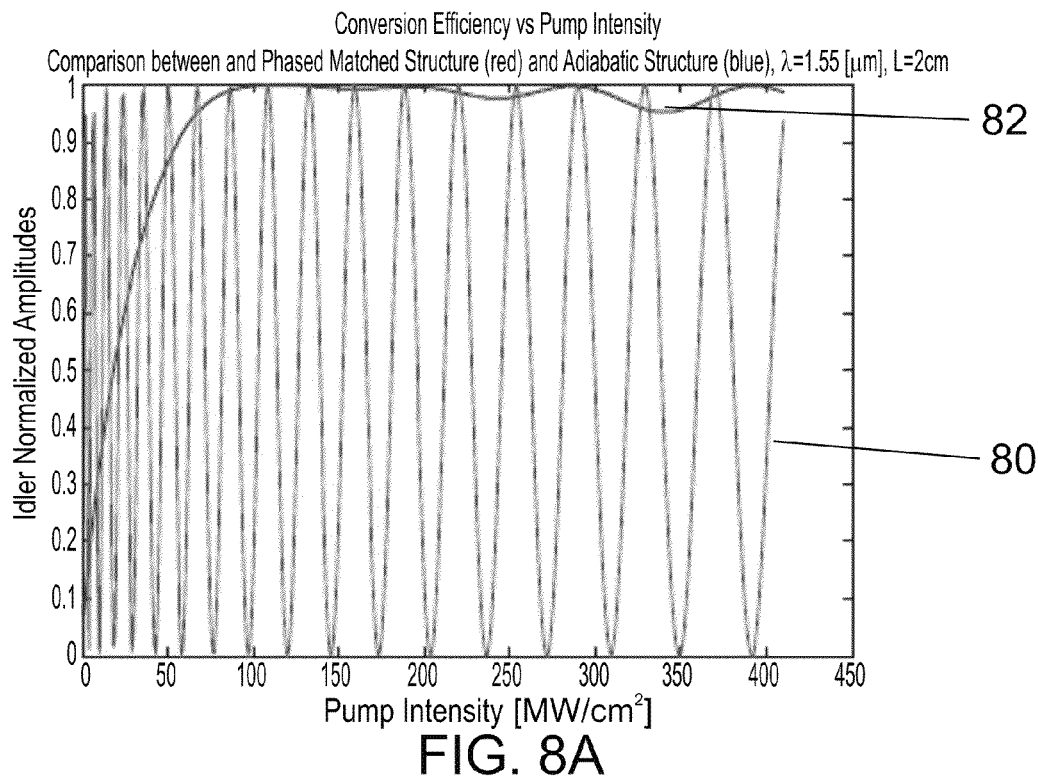
FIGS. 8A and 8B are simplified graphs for two crystal lengths respectively, showing efficiency of the frequency conversion process over a range of pump intensities for the periodic and adiabatic aperiodic cases.

Reference is now made to FIG. 8(a), A comparison between the periodically poled structure 80 and the adiabatic structure 82 for crystal length of (a) 20 mm (b) 19 mm, is shown for different pump intensities. Efficiency above 90% is achieved only for specific values of the pump intensities (such as $I_2=110$ MW/cm²) in the periodically poled structure, whereas in the adiabatic structure, efficient broadband conversion is achieved for any pump frequency which is above a certain threshold.

Figure 8B:
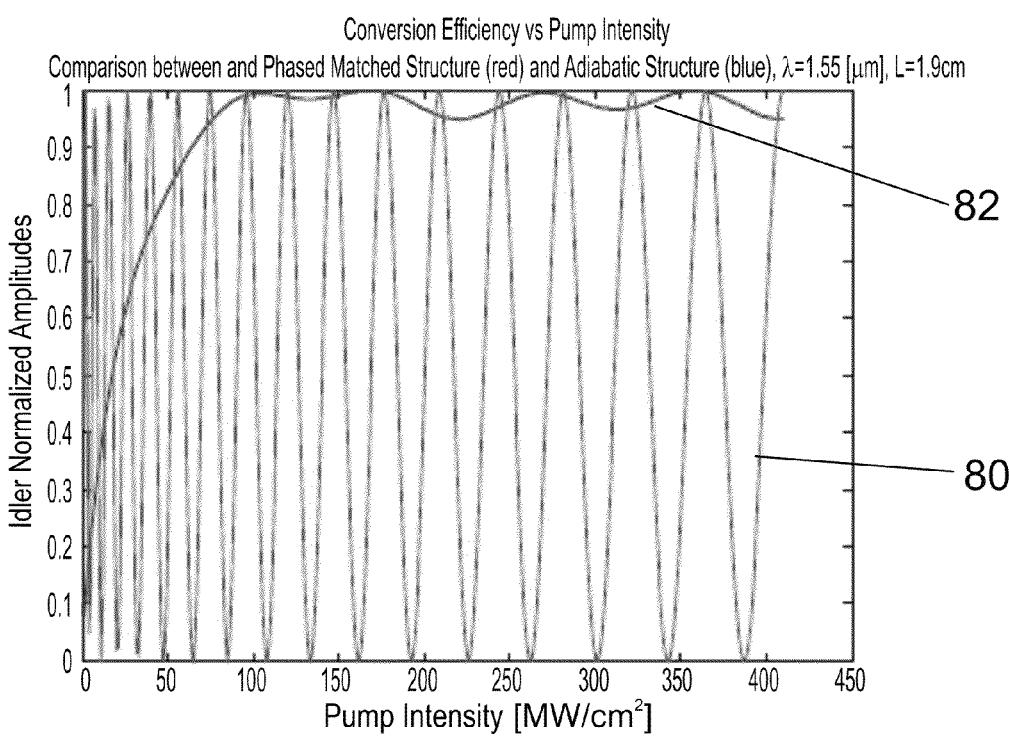

When we check the robustness of the same structure, but with different length (19 mm instead of 20 mm), we see as per FIG. 8(b) that the efficiency in the periodically poled structure drops almost to zero, whereas in the adiabatic structure it remains as before.

That is FIG. 8 shows a comparison between the periodically poled structure 82 and the adiabatic structure 80 for crystal length of (a) 20 mm (b) 19 mm, for different pump intensities. Efficiency above 90% is achieved only for specific values of the pump intensities (such ash $I_2=110$ MW/cm²) in the periodically poled structure, whereas in the adiabatic structure, efficient broadband converter is achieved for any pump frequency which is above a certain threshold. This broadband efficiency does not drop even if the length of the crystal is varied as shown in (b).

Pump Frequency Parameter

Figure 9:
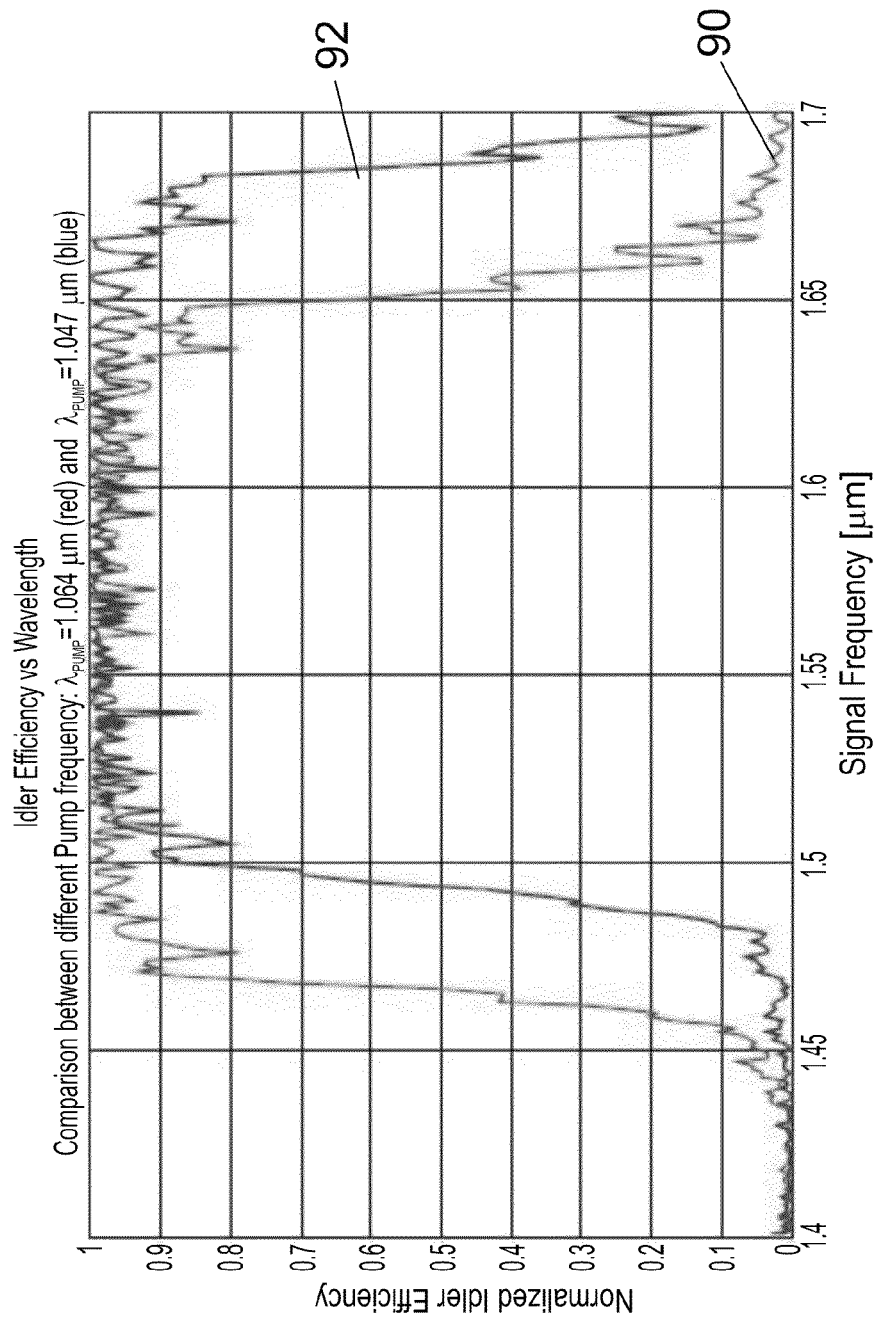
FIG. 9 is a simplified graph showing the use of two different pump frequencies on the same adiabatic aperiodic crystal.

In the following, it is demonstrated that by changing the frequency of the pump, the broadband response is shifted, while maintaining its broadband characteristics. Reference is now made to FIG. 9 in which the idler efficiency response is compared with the signal frequency at two different pump frequencies. A characteristic for a first pump frequency with $\lambda_2=1.064$ μm is shown as 90, and a second characteristic with $\lambda_2=1.047$ μm is shown as 92. It is clearly seen that the response efficiency is maintained, but it is shifted 25 nm to a higher signal and idler wavelength.

That is to say, FIG. 9 shows an idler efficiency response vs signal frequency in two different pump frequencies, the original frequency $\lambda_2=1.064$ μm shown as 90, and the second frequency $\lambda_2=1.047$ μm shown as 92. It is clearly seen that the response efficiency is maintained, but it is shifted 25 nm to higher signal and idler wavelengths.

Theory and Experiment Using a KTP Device

The following represents the theory and practice behind a further embodiment of the present invention. This further embodiment provides a geometrical representation of the process of sum frequency generation in the undepleted pump approximation, in analogy with the known optical Bloch equations. We use this analogy to propose a technique for achieving both high efficiency and large bandwidth in sum frequency conversion using the adiabatic inversion scheme. The process is analogous with rapid adiabatic passage in NMR, and adiabatic constraints are derived in this context. This adiabatic frequency conversion scheme is realized experimentally using an aperiodically poled potassium titanyl phosphate _KTP_ device, where we achieved high efficiency signal-to-idler conversion over a bandwidth of 140 nm.

In the following sections equations are numbered again starting from 1.

The generation of tunable optical radiation typically relies on nonlinear frequency conversion in crystals. As discussed above, light of two frequencies is mixed in a nonlinear crystal, resulting in the generation of a third color at the sum or difference frequency. These three-wave mixing processes, also known as frequency upconversion or downconversion, are typically very sensitive to the incoming frequencies, due to the requirement of phase matching. Thus angle, temperature or other tuning mechanisms are needed to support efficient frequency conversion. This particularly affects efficient conversion of broadband optical signals, since simultaneous phase matching of a broad frequency range is hard to achieve.

Solving the general form of the wave equations governing three wave mixing processes in a nonlinear process is not an easy task. The three nonlinear coupled equations can be simplified assuming that one incoming wave, termed pump, is much stronger than the other two. This "undepleted pump" approximation results in two linear coupled equations rather than the three nonlinear ones. In the case of the sum frequency generation (SFG) process discussed above, this simplified system possesses SU(2) symmetry, sharing its dynamical behavior with two other states systems, namely nuclear magnetic resonance (NMR) and the interaction of coherent light with a two-level atom. In the context of the present embodiment we explore this analogy, and in particular the geometrical visualization using the approach presented by Bloch and Feynman et al. The simple vector form of the coupling equation can bring physical insight into the problem of frequency conversion, enabling a more intuitive understanding of the effects of spatially varying coupling and phase mismatch. The utility of this approach is demonstrated by introducing a robust, highly efficient method for broadband wavelength conversion based on the mechanism known as rapid adiabatic passage RAP, using an adiabatic crystal based on the considerations set forth hereinabove.

The demonstration is experimentally realized using an adiabatically varying aperiodically poled potassium titanyl phosphate (APPKTP) crystal in a quasiphased matched (QPM) design. Aperiodically poled structures are as discussed above and may improve the bandwidth response of frequency conversion, but this has been at a cost of a significantly reduced efficiency in the prior art. The broad bandwidth response is useful for frequency conversion of ultrashort pulses. Chirped QPM gratings have been utilized to manipulate short pulses both in second harmonic generation (SHG), difference frequency generation (DFG), and in parametric amplification. Recently, crystals with random QPM have been shown to exhibit extremely broad bandwidth, although at a price of severe reduction of the conversion efficiency. While in standard frequency conversion processes, the crystal parameters and the pump intensity may be precisely controlled in order to reach high conversion efficiency, we show with the present embodiment that by utilizing adiabatic frequency conversion one can still reach nearly 100% conversion efficiency over a broad wavelength and temperature range. In the experimental results given hereinbelow for the present embodiment we demonstrate near complete conversion while maintaining extremely broad bandwidth of over 140 nm.

Let us first consider the geometrical representation of SFG. In the undepleted pump approximation, the pump amplitude is assumed constant along the nonlinear crystal, and the following normalized coupled equations can be constructed:

$$i\frac{d\tilde{A}_1}{dz} = \kappa \tilde{A}_3 e^{-i\Delta kz}, \tag{1a}$$

$$i\frac{d\tilde{A}_3}{dz} = \kappa^* \tilde{A}_1 e^{+i\Delta kz}. \tag{1b}$$

Here, $\Delta k = k_1 + k_2 - k_3$ is the phase mismatch, z is the position along the propagation axis, $$\kappa = \frac{4\pi w_1 w_3}{\sqrt{k_1 k_3}\, c^2} \chi^{(2)} A_2$$

is the coupling coefficient. The normalized signal and idler amplitudes are $$\tilde{A}_1 = \frac{c}{4\omega_1}\sqrt{\frac{k_1}{\pi \chi^{(2)} A_2^*}}\, A_1 \text{ and } \tilde{A}_3 = \frac{c}{4\omega_3}\sqrt{\frac{k_3}{\pi \chi^{(2)} A_2}}\, A_3,$$

where $\omega_1$ and $\omega_3$ are the frequencies of the signal and idler, respectively, $k_1$ and $k_3$ are their associated wave numbers, c is the speed of light in vacuum, $A_1$, $A_2$, $A_3$ are the signal, pump, and idler amplitudes, respectively, and $X^{(2)}$ is the second order susceptibility of the crystal. Without loss of generality, we choose $\omega_2$ such that $\omega_1 + \omega_2 = \omega_3$.

These coupled wave equations have the same form as those describing the dynamics of quantum mechanical two level systems. Their dynamics are dictated by $\Delta K(z)$ and $\kappa$, and can be solved analytically only for limited cases. One such solvable example is when the phase mismatch is constant. In this case, full energy transfer from signal to idler (A1 to A3 conversion, which is termed as the SFG or upconversion process) is achievable only in the case of perfect phase matching along the entire propagation, i.e. $\Delta K(z)=0$, and only when $\kappa \cdot z = n\pi$ is satisfied with odd n. Other constant phase mismatches result in an inefficient frequency conversion.

Methods for approximate solutions, such as perturbation theory, are also available. In the weak coupling limit, the dynamics can be solved fully in the Fourier domain but due to its perturbative nature, it will be limited to low conversion values. In general, this complex valued dynamics, which posses SU(2) dynamical symmetry, and in particular when the phase mismatch parameter varies along the propagation, there is no known analytical solution, a statement which is also true in the analogous NMR and light-matter interaction two level problems. A recent review summarizes the known analytical solutions in the context of coherent light interaction with two level systems. For those cases which are not solvable analytically, it is convenient to use the geometrical representation, with which one gains a physical intuition on conversion along the propagation direction, without solving or simulating the process.

We adopt the Feynman et al. formulation and write the dynamics of this problem as a real three dimensional vector equation, which can be visualized geometrically on a sphere, known as the Bloch sphere. In this context, we define a state vector, $\vec{\rho}_{SFG}$=(U,V,W) as follows:

$$U_{SFG}=A_3^*A_1+A_1^*A_3, \quad (2a)$$

$$V_{SFG}=i(A_3^*A_1-A_1^*A_3), \quad (2b)$$

$$W_{SFG}=|A_3|^2-|A_1|^2. \quad (2c)$$

This vector represents the relation between the signal and idler fields along the crystal. In particular, the z component ($W_{SFG}$) gives information about the conversion efficiency.

The south pole $\vec{\rho}$=(0,0,-1) corresponds to zero conversion ($A_3$=0), while the north pole $\vec{\rho}$=(0,0,1) corresponds to full conversion. In between, the conversion efficiency can be evaluated by $\eta=(W_{SFG}+1)/2$. The torque vector $$\vec{g}=(Re\{\kappa\},Im\{\kappa\},\Delta k)$$

represents the coupling between the two fields. The loss-free evolution equations can be written as a single vector precession equation:

$$\frac{d\vec{\rho}_{SFG}}{dz}=\vec{g}\times\vec{\rho}_{SFG}. \quad (3)$$

There is a clear analogy then between the two-level system and frequency conversion: The population of the ground and excited states are analogous to the magnitude of the signal ($A_1$) and idler ($A_3$) fields, respectively. Time evolution is replaced by propagation along the z axis, and the detuning $\Delta$ is replaced by the phase-mismatch $\Delta k$ value; this analogy is further detailed in Table I hereinbelow. In this context, a perfect phased matched solution for full conversion has the same dynamic trajectory on the Bloch sphere surface as on-resonant interaction in atomic physics. This results in oscillatory dynamics between the two modes, a phenomenon known as "Rabi oscillations". An odd $\pi$ pulse in optical resonance is analogous to full transfer of energy from $\omega_1$ to $\omega_3$, which is known as an upconversion process.

Reference is now made to FIG. 10 which illustrates Bloch sphere geometrical representation of SFG in the undepeleted pump approximation. FIG. 10(a) shows a periodically poled quasiphased crystal with a constant phase matching value along the propagation. FIG. 10(b) shows geometrical visualization of the SFG dynamics on an SFG Bloch sphere. Two trajectories are plotted: perfect phase matching (blue, torque vector points to the equator) which can result in efficient conversion and a constant nonzero phase mismatch (red, torque vector points to a point in the southern hemisphere), always resulting in an inefficient conversion process. FIG. 10(c) shows the projection of the trajectory onto the z axis that yields the conversion efficiency. This can be visualized in the Bloch sphere representation as a rotation of the SFG state vector from the south pole to the north pole. Any phase mismatch leads to a dynamics similar to a detuned resonance interaction, which exhibits faster oscillations and lower conversion efficiencies, as shown in FIG. 10(c). Note that due to the symmetry of the coupled equations, one can start the process with $\omega_3$ as input frequency, that is assuming $\omega 3 > \omega 2$. In this case $A_1(z=0)=0$, and a difference frequency generation (DFG) process between the weak input at $\omega 3$ and the strong pump $\omega_2$ may occur, resulting in generation of the lower frequency $\omega_1=\omega_3-\omega_2$. The equivalent Bloch sphere representation is a rotation of the state vector from the north pole toward the south pole.

TABLE 1

Analogy between the SFG process in the undepleted pump approximation and the dynamics of a two level atomic system. induced by coherent light. The middle column describes the optical Bloch sphere realization of the two level systems (Ref. [2]). The right column shows the analogous parameters of the SFG sphere realization.

| Parameter | Optical Bloch sphere | SFG sphere realization |
|---|---|---|
| Evolution parameter | time | z axis |
| Ground/excited state population | $|a_g|^2 \cdot |a_e|^2$ | $|A_1|^2 \cdot |A_3|^2$ |
| Energy difference | $\omega_o = \omega_{fg}$ | $n(\omega_2)\omega_2/c$ |
| Detuning/phase mismatch | $\Delta$ | $\Delta k$ |
| "Rabi" frequency | $\Omega_0 = \frac{1}{\hbar}\mu E_{in}$ | $\kappa = \frac{4\pi w_1 w_3}{(k_1 k_3)^{1/2} c^2}\chi^{(2)} E_2$ |
| Torque vector | $\Omega = (Re\{\Omega_0\} \cdot Im\{\Omega_0\} \cdot \Delta)$ | $g = (Re\{\kappa\}, Im\{\kappa\}, \Delta k)$ |
| State vector—p | $(Re\{a_f^* a_g\}, Im\{a_f^* a_g\} \cdot |a_f|^2 - |a_g|^2)$ | $(Re\{A_3^* A_1\} \cdot Im\{A_3^* A_1\} \cdot |A_3|^2 - |A_1|^2)$ |

This analogy could be extended to include the semiphenomenological decay constants $T_1$ and $T_2$, which appear in the original Bloch equations. In nuclear resonance, those are called the longitudinal and the transverse lifetimes. For spins they govern the decay of the magnetic spin components which are parallel or perpendicular static components of the magnetic field. In the present context, these parameters are characteristics length scales rather than times. The $1/T_1$ relaxation coefficient is related to the characteristic absorption—or loss—length along the propagation [$\alpha(\omega_i)$]. Loss results in the decrease of the total intensity of the process along the propagation direction, i.e., $|A_1(z)|^2+|A_3(z)|^2<|A_1(0)|^2+|A_3(0)|^2$, and is visualized in the Bloch sphere representation, as the shrinking of the state vector toward the origin. The $1/T_2$ relaxation parameter, which is related to the decay of polarization through dephasing and loss, could be included to describe random distribution of wave vectors, pointing slightly differently from the propagation axis, effecting dramatically the phase mismatch parameter and thus conversion efficiency.

In order not to obscure the main features of the analogy, and due to the fact that the typical values of loss in such processes for the near IR and visible regimes in standard crystals are less than 1%/cm, we decide not to include these parameters in the current model. We note that they could add new insight to the dynamics of this SFG process in the presence of loss and dephasing, which may be important near crystal resonances, thus in the near UV for KTP, where losses become non-negligible.

Due to the above, achievement of full energy transfer in an upconversion process is usually not robust, requiring several ingredients to be simultaneously satisfied. However, from the above analogy we can adopt the RAP mechanism, where a strong chirped excitation pulse scans slowly through resonance to achieve robust full inversion, to the realm of frequency conversion. Thus in order to transfer from $A_1(z)$ to $A_3(z)$ the phase mismatch parameter, $\Delta k(z)$ may be very large compared to $x$, and may change adiabatically from a big negative (positive) value to a large positive (negative) value along the crystal. The adiabaticity condition requires that $$\left|\frac{d\Delta k}{dz}\right| \ll \frac{(\Delta k^2 + \kappa^2)^{3/2}}{\kappa}. \quad (4)$$

If the rate of variation is not slow enough, or the coupling coefficient is not large enough, this inequality may not be satisfied and the conversion efficiency will be poor.

Reference is now made to FIG. 11 which illustrates an adiabatic conversion scheme of SFG. FIG. 11(a) shows a case in which continuous adiabatic variation of the phase mismatch parameter is required. In FIG. 11(b) the case is shown of the adiabatic following trajectory, where the torque vector initially points to the vicinity of the south pole, and ends up at the vicinity of the north pole. FIG. 11(c) illustrates the projection of the trajectory onto the z axis. In this trajectory, a phase matching condition is fulfilled only at z=1 cm, and the effective length of the conversion is 3 mm—indicated by a dashed red line. FIG. 11 in fact demonstrates the case when all those constraints are satisfied and full frequency conversion is achieved. This picture could also hold for efficient upconversion of ultrashort pulses. For this to happen, the dispersion properties of the nonlinear crystal, which have an impact on the temporal envelope, have to be considered. Note, first, that the pump wave, which remains a narrow band along the propagation direction, does not impose any limitation from the dispersion point of view. Second, in the adiabatic limit, the conversion process occurs in a localized region along the crystal, as illustrated in FIG. 11(c). An estimation of the characteristic length is $L_{eff}=$ $$\frac{\kappa}{d\Delta k/dz}.$$

The main effects that should be considered in this context are group velocity mismatch (GVM), and group velocity dispersion (GVD). GVM causes a temporal walkoff of the incoming signal pulse ($\omega_1$) and the generated idler pulse ($\omega_3$) due to their different group velocities.

A second order process due to GVD leads to an addition of linear chirp along the propagation. For both effects to be negligible, their characteristic lengths should be much larger than the adiabatic effective length mentioned above. A standard estimation of the effect of GVM on short pulse propagation is $$L_{GVM} = \frac{\tau}{GVM},$$

with $$GVM = \left(\frac{1}{u_g(\lambda_1)} - \frac{1}{u_g(\lambda_3)}\right),$$

and $u_g(\lambda_i)$ is the group velocity of wavelength $\lambda_i$. In order to minimize GVM, one should ask for overlapping of the signal ($\omega_1$) and idler ($\omega_3$) pulses along the conversion length, i.e., Lef f<<LGVM. The minimal temporal width of the pulse should therefore be $\tau_{GVM}=L_{eff}$GVM. For near IR to visible conversion, this translates to about 1 ps. However, this does not mean that shorter pulses cannot be converted: in order to convert a transform limited 100 fs pulse, one should pre-stretch the pulse to approximately 10 ps by adding linear chirp. This chirp, which reduces the effect of temporal walkoff, should be removed at the output of nonlinear crystal.

This described mechanism is analogous to the chirped pulse amplification method. The second order effect of GVD is defined by $$\beta = \frac{d^2 w}{dk^2}$$

and its characteristic length is $$L_{GVD} = \frac{\tau}{\beta}$$

The GVD parameter which should be used in this calculation is that of the shorter wavelength, which is typically the larger one. In our design $L_{GVD}(\lambda=620$ nm$)\approx2.5$ cm. This value satisfies $L_{eff} \ll L_{GVD}$, and thus can be neglected. We checked that higher order dispersion effects can be neglected as well. Another inherent phenomenon which exists in wavelength conversion through aperiodically poled structures is the addition of linear chirp, positive or negative, when propagating along the crystal. This chirp, too, can be removed at the output.

In the experimental realization of this adiabatic conversion scheme we utilize the technique of QPM_18_. By tuning the spatial structure of the domains, this technique allows us to design almost any desired function of the phase mismatched parameter. In particular, it is possible to achieve an effective phase mismatch parameter which is the summation of the process phase mismatch and the artificial phase mismatch, i.e., $\Delta k_{eff}(z)=k_{signal}+k_{pump}-k_{idler}-\Delta k_A(Z)$. The desired phase-mismatch parameter is achieved by poling the QPM structure using the approximate relation:

$$\Delta k_\Lambda(z) = \frac{2\pi}{\Lambda(z)},$$

where $\Lambda(z)$ is the local poling period.

An adiabatic APPKTP was designed to satisfy the constraints posed by Eq. (4). The periodicity was varied from 14.6 to 16.2 μm along a crystal length of L=17 mm, to induce a linear adiabatic which is required for adiabatic full conversion. The change may be in $k_{eff}(z)$. An intensity of 90 MW/cm² is required for full adiabatic conversion, a much lower value than the damage threshold of the KTP crystal, which is approximately 500 MW/cm². The design was carried out using a numerical simulation of the process propagation of Eq. (1) using the finite difference method. We used an optical parametric oscillator system (Ekspla NT342) to produce simultaneously a strong pump at 1064 nm (6 ns, 130 µJ), and a tunable signal that could be varied from 1400 to 1700 nm (5 ns, 1 µJ). The pump and the signal, both polarized in the extraordinary axis, were spatially overlapped and focused collinearly into the crystal with waists of 150 and 120 µm$^2$, respectively. These values guarantee that the Rayleigh range is larger than the crystal length. We recorded the input signal and the output SFG signal by an InGaAs detector and a cooled chargecoupled device (CCD) spectrometer, respectively.

Figure 12:
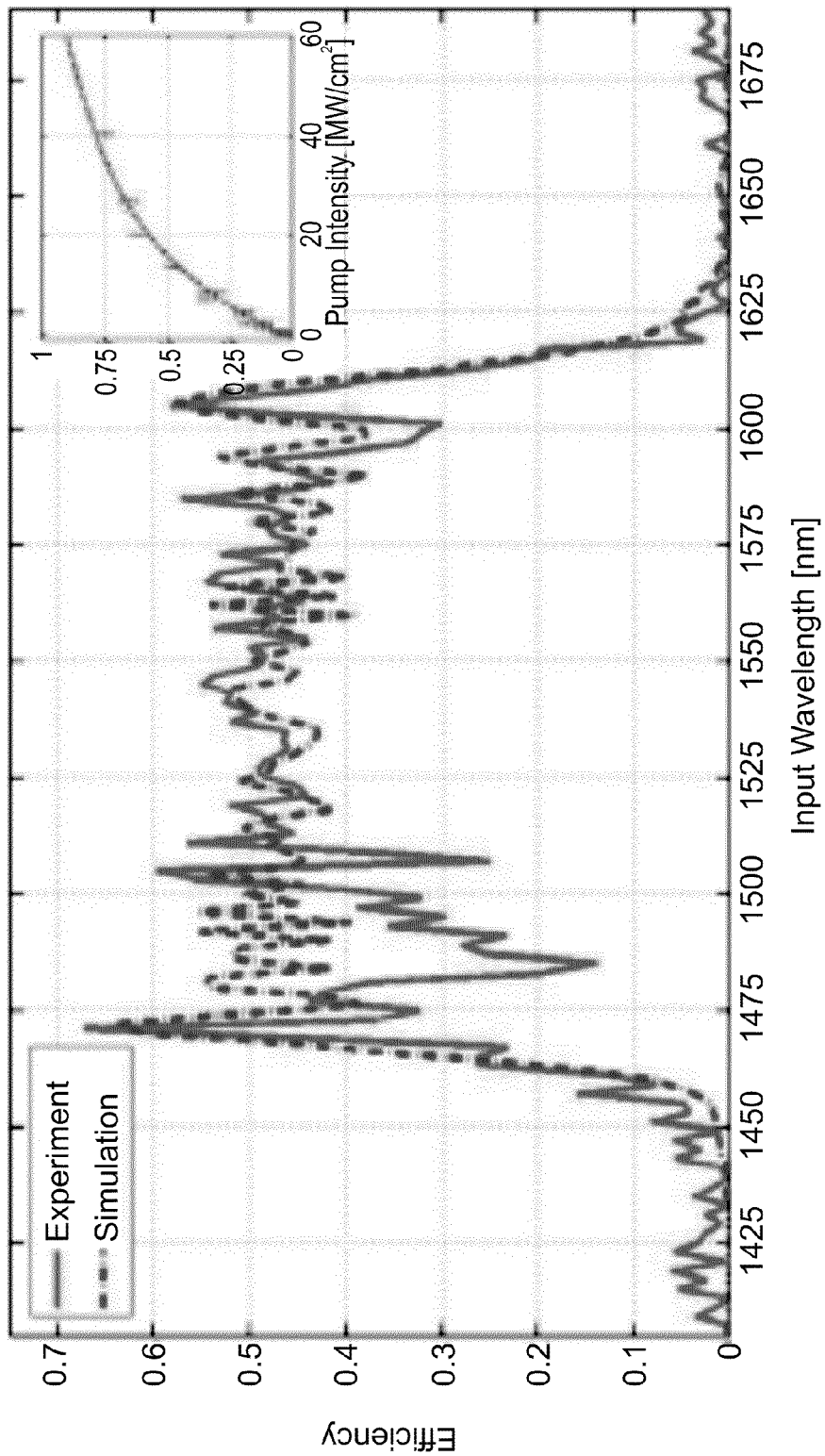
FIG. 12 is a graph illustrating conversion efficiency as a function of input wavelength, with results being shown both for simulated and experimental results.

We first examined the dependence of the conversion efficiency on the pump intensity at a fixed signal wavelength of 1530 nm. The conversion efficiency was measured by comparing the signal intensity with and without the presence of the pump. This was checked to be completely correlated with the observed SFG intensity and free of thermal effects. The results are presented in the inset of FIG. 12. FIG. 12 is a graph illustrating conversion efficiency as a function of input wavelength using the adiabatic APPKTP design at a pump intensity of 15 MW/cm$^2$ at room temperature. The inset shows conversion efficiency as a function of pump intensity with an input wavelength of 1530 nm. The maximal conversion efficiency was 74%±3%.

In general good correspondence is obtained with numerical simulation. We also measure the conversion efficiency as a function of signal wavelength at a constant pump intensity of 15 MW/cm$^2$ and at room temperature. We show in FIG. 12 efficient broadband conversion of a wavelength range of over 140 nm wide (1470-1610 nm). This is in good correspondence with the numerical simulation of the design (see dashed-dotted blue line in the figure), except for a small region of low efficiency around 1485 nm, which is associated with a manufacturing defect, thus causing the violation of the adiabacity condition. Note that a standard periodically poled structure designed to achieve perfect phase matching would lead to efficient broadband conversion over a 2-nm bandwidth only.

The adiabatic conversion scheme is robust to variations in the parameters of the crystal as well as of the light. In particular, the conversion efficiency is insensitive to input wavelength, crystal temperature, pump intensity, crystal length, and the angle of incidence.

In conclusion, the embodiment shows that a geometrical Bloch sphere visualization can be used to describe the evolution of the complex mode amplitudes in a SFG process. We use this picture to design a high efficiency wavelength converter which is the analog of adiabatic rapid passage in two level systems. It is noted that the quasiphase matched crystal is only one possible realization; the same mechanism can be applied, for example, by inducing a temperature gradient on a perfect phased matched crystal, or by any other mechanism fulfilling the adiabatic constraints. The present scheme can be utilized for efficient frequency conversion of broadband signals as well as ultrashort pulses. It may be valid if the ultrashort pulse is initially stretched, then upconverted, and finally recompressed at the output. This analysis may hold promise for efficient upconversion of broadband fluorescent signals as well as ultrashort pulses in a wide range of frequencies from UV to far IR. It may be particularly useful in the efficient upconversion of weak infrared signals to the near-infrared or visible range, used in atmospheric observation. The generalization of this analogy to higher order nonlinear processes interaction can be made as well, and other known schemes from atom-photon interaction or NMR, such as stimulated Raman adiabatic passage (STIRAP) can be adopted.

Theory and Experiment—with Tenability Demonstrated

Reference is now made to a further embodiment of the present invention. Again a theoretical device is discussed and then there is experimental demonstration of the robustness of the discussed adiabatic sum frequency conversion method. The technique of the present embodiment is borrowed, as in the previous embodiment, from an analogous scheme of robust population transfer in atomic physics and nuclear magnetic resonance, and enables the achievement of nearly full frequency conversion in a sum frequency generation process for a bandwidth up to two orders of magnitude wider than in conventional conversion schemes. We show that this scheme is robust to variations in the parameters of both the nonlinear crystal and of the incoming light. These include the crystal temperature, the frequency of the incoming field, the pump intensity, the crystal length and the angle of incidence. Also, we show that this extremely broad bandwidth can be tuned to higher or lower central wavelengths by changing either the pump frequency or the crystal temperature. The detailed study of the properties of this converter uses the Landau-Zener theory dealing with the adiabatic transitions in two level systems.

1. INTRODUCTION

Nonlinear frequency conversion via three wave mixing process is a fundamental concept in the field of nonlinear optics. In this process, light of two colors is mixed in a nonlinear crystal, resulting in the generation of a third color with their sum or difference frequency. These processes (also termed frequency up-conversion and down-conversion, respectively) usually exhibit a tradeoff between the conversion bandwidth and the conversion efficiency.

In the above, we have shown that the sum frequency generation (SFG) process in the undepleted pump approximation can be mathematically formulated and geometrically visualized in complete analogy with the framework of a two-level system, as introduced by Bloch in NMR and Feynman and coworkers in atomic physics. In this regime the conversion process is governed by a set of two linear coupled wave equations whose properties depend on two parameters:

the phase mismatch along the propagation direction and
the coupling coefficient, which is a function of both the characteristics of the pump wave and the properties of the nonlinear crystal.

The geometrical visualization gives physical intuition to the process of SFG.

In this section equations are again numbered from 1.

In the usual scheme of sum frequency generation, these two parameters are assumed to be constant, and thus the evolution of these waves along the propagation axis can be solved analytically. Only a few more analytic solutions of this form of linear coupled wave equations, which exhibit SU(2) dynamical symmetry, are known. However, most of these have not been implemented in the field of frequency conversion. Two approximate solutions to this set of equations are worth mentioning in this context. The first is the perturbative approximation, which in the realm of frequency conversion is the case of weak coupling between the signal and idler waves.

This approximation was termed as the 'unamplified signal approximation', and corresponds to a low signal-to-idler conversion efficiency. With the perturbative approximation, the dynamics of the process can be fully solved either in real space or using Fourier domain.

The second approximation is the adiabatic approximation. By exploring the application of the rapid adiabatic passage (RAP) scheme in the realm of frequency conversion, we have shown that the requirements of high efficiency and broad bandwidth can be reconciled, by adiabatically varying the phase mismatch parameter along the propagation, allowing nearly complete transfer of energy from one wavelength to another in a robust manner. The detailed study of the properties of this converter is done using the Landau-Zener theory dealing with adiabatic transitions in two level systems.

The implementation of this converter is done by aperiodically poling in a quasi-phased matched crystal. Such structures were extensively studied in the last decade, mainly due to the fact they enable to tailor the desired phase mismatch function in a simple manner. Linear chirp gratings were shown to have broad response also in second harmonic generation (SHG), difference frequency generation (DFG) and optical parametric amplifier (OPA) and other nonlinear processes. Random structures and segmented structures were also suggested to improve bandwidth response in nonlinear processes, but again with poor efficiency. It should be noted that the dynamics of different nonlinear processes are affected differently by these aperiodic structures. Only in SFG process, the geometrical visualization on Bloch sphere, and the suggested adiabatic solution with its connection to Landau-Zener theory are valid.

In the present embodiment, we demonstrate the robustness of the adiabatic SFG scheme to most of the parameters which control the efficiency of the process. These include the crystal temperature, the frequency of the incoming field, the pump intensity, the crystal length and the angle of incidence. We show that in contrast with the conventional perfect phase-matched crystal, where simultaneous matching of these control parameters are needed, in this scheme, the conversion efficiency is insensitive to change of one or more of those parameters. Also, we demonstrate that this ultra broad bandwidth converter can be tuned to higher or lower central wavelengths by changing either the pump frequency or the crystal temperature.

2. THEORETICAL ANALYSIS

2.1. Dynamics and Geometrical Representation of Sum Frequency Generation Process In the undepleted pump approximation, the pump amplitude is assumed constant along the nonlinear crystal, and the following normalized coupled equations for the signal and idler can be constructed:

$$\frac{d\tilde{A}_1}{dz} + \frac{1}{v_{g1}} \frac{d\tilde{A}_1}{dt} = -i\kappa \tilde{A}_3 e^{-i\Delta k z} \quad (1)$$

$$\frac{d\tilde{A}_3}{dz} + \frac{1}{v_{g3}} \frac{d\tilde{A}_3}{dt} = -i\kappa \tilde{A}_1 e^{+i\Delta k z} \quad (2)$$

where $\Delta k = k_1 + k_2 - k_3$ is the phase mismatch, z is the position along the propagation axis, $$k = \frac{4\pi \omega_1 \omega_3}{\sqrt{k_1 k_3 c^2}} \chi^{(2)} A_2$$

is the coupling coefficient. The normalized signal and idler amplitudes are:

$$\tilde{A}_1 = \frac{c}{4\omega_1} \sqrt{\frac{k_1}{\pi \chi^{(2)} A_2^*}} A_1$$

and $$\tilde{A}_3 = \frac{c}{4\omega_3} \sqrt{\frac{k_3}{\pi \chi^{(2)} A_2}} A_3,$$

where $\omega_1$ and $\omega_3$ are the frequencies of the signal and idler, respectively, $k_1$ and $k_3$ are their wave numbers, $v_{g1}$ and $v_{g3}$ are their group velocities, c is the speed of light in vacuum, $A_1$, $A_2$, $A_3$ are the signal, pump and idler amplitudes, respectively, and $\chi^{(2)}$ is the 2nd order susceptibility of the crystal (assumed to be frequency independent). In the case where the temporal envelope of the waves are much longer than the length of the crystal (i.e. where we consider monochromatic, quasi-monochromatic laser beams, or stretched ultrashort pulses), one can omit the influence of the waves' group velocities.

In the present embodiment we deal with quasi-monochromatic laser beams. In the case of ultrashort pulse upconversion, one should first stretch the pulse, in order to minimize the deleterious effect of group velocity mismatch and group velocity dispersion. Typically, a pulse length of more than 1 ps would suffice for an interaction in the visible and near infrared. The converted pulse would be re-compressed to a transform-limited pulse after exiting from the nonlinear crystal.

As discussed earlier, these coupled wave equations, have the same form as those describing the dynamics of quantum mechanical two level systems. Here, the time evolution is replaced by propagation in the longitudinal z-axis, and the detuning $\Delta$ is replaced by the phase-mismatch $\Delta k$ value; also, the population of the ground and excited states are analogous to the magnitude of the signal and idler fields, respectively. To obtain a physical intuition of the SFG dynamics, we use the geometrical picture of this process, where we adopt the formulation of Feynman et. al. In this framework, a real three dimensional vector equation can explore the dynamics of this problem, and any z-dependent function of $\Delta k(z)$ and $\kappa(z)$, can be visualized as a trajectory on the surface of an upconversion Bloch sphere. The loss-free evolution equations can be written as a single vector precession equation $$\frac{d\vec{\rho}_{SFG}}{dz} = \vec{g} \times \vec{\rho}_{SFG},$$

where the three dimensional state vector is defined as follows $$\vec{\rho}_{SFG} = (U, V, W) = (A_3^+ A_1 + A_3 A_1^+, i(A_3^+ A_1 - A_3 A_1^+), |A_3|^2 - |A_1|^2),$$

and includes the coherence between the signal and idler amplitudes along the propagation direction. In particular, its z component ($W_{SFG}$) gives information about the conversion efficiency. The south pole $\vec{\rho} = (0,0,-1)$ corresponds to zero conversion ($A_3 = 0$), while the north pole $\vec{\rho} = (0,0,1)$ corresponds to full conversion. In between, the conversion efficiency is defined as: $\eta = (W_{SFG} + 1)/2$. The rotating vector (also known as the torque vector), $\vec{g} = (\text{Re}\{k\}; \text{Im}\{k\}; \Delta k)$, represents the coupling between the signal and idler frequencies, and the size of the phase mismatch parameter. This analogy was extended to include the semi-phenomenological decay constants $T_1$ and $T_2$, which appear in the original Bloch equations, and in our context are characteristic decay lengths rather than times. As seen, the evolution of the SFG process is dictated by Δk (z) and κ, and in most of the cases, no analytical or approximate solution exists. In such cases, the geometrical visualization could be helpful, where the trajectory of the SFG process, for any function of Δk (z) and κ(z), is guaranteed to be on the surface of the SFG Bloch sphere.

2.2. Adiabacity Criteria and Application of Landau-Zener Theory

One important approximation to the dynamic problem is the adiabatic solution. In this case, the sweep rate of the phase mismatch parameter along the propagation varies slowly with respect to the square of the coupling term, i.e.

$$\left|\frac{d\Delta k}{dz}\right| << \frac{(\Delta k^2 + \kappa^2)^{3/2}}{\kappa}. \tag{3}$$

Also, for an efficient and broadband process to occur, the phase mismatch parameter, Δk (z) should be very large compared to κ, and should change adiabatically from a large negative value to a large positive value, i.e. |Δk|>>κ; Δk(z=0)<0; Δk(z=L)>0. These adiabatic constraints are derived by following their analogous dynamical counterparts in the RAP mechanism, where a strong chirped excitation pulse scans slowly through the resonance to achieve robust full inversion. If the rate of variation is not slow enough, or the coupling coefficient is not large enough, this inequality will not be satisfied and the conversion efficiency will be poor. Clearly, in any practical realization, where the crystal length is finite, the adiabacity condition, corresponding to a conversion efficiency of 100%, can only be asymptotically reached. Note again, that all of the adiabatic constraints have to be satisfied in order to achieve this robust mechanism. This explains why in the case of constant phase mismatch (such as in the periodically poled crystal), where the sweep rate is zero, and although the requirement of Eq. 3 is satisfied, adiabatic conversion would not occur.

When the phase-mismatch Δk(z) is varied linearly along the crystal, a simple parameter for the degree of adiabaticity appears. In the quantum literature it is known as the Landau-Zener criterion, which in the frequency conversion realm is written as:

$$\eta_{LZ}(z \to \infty) = 1 - e^{-\frac{4\kappa^2}{\pi|d\Delta k/dz|}}. \tag{4}$$

This analytical expression gives the signal-to-idler conversion efficiency of the SFG process. The expression depends exponentially on an adiabatic parameter, defined as $$\alpha \equiv \frac{\pi|d\Delta k/dz|}{4\kappa^2},$$

i.e. the ratio between the sweep rate of the phase mismatch, dΔk/dz, and the square of the coupling coefficient, $\kappa^2$.

Mathematically this represents the ratio between the left hand side and the right hand side of Eq. 3, at the location where Δk=0. Adiabatic propagation is obtained when a<<1, which is the case where the conversion efficiency reaches unity. This can be achieved either by changing slowly the sweep rate at a given pump intensity, or by applying strong pump for a given sweep rate.

Reference is now made to FIG. 13 which shows Bloch sphere trajectories of SFG of three different intensities (a) 440 MW/cm² (b) 80 MW/cm² (c) 4 MW/cm². The south-pole represents the amplitude of the input frequency, and the north-pole represents the amplitude of the converted frequency. (d) The projection of the trajectories onto the W axis yields the conversion efficiency along the propagation.

In these trajectories, phase matching condition is fulfilled at z=1 cm, and. Also, we added the calculated output conversion efficiency of each trajectory by using Eq. 4, which is the Landau-Zener formula in the real of frequency conversion. (e) Continuous adiabatic variation of the phase mismatch parameter is required. This can be achieved by slowly changing the poling periodicity along the propagation direction as will be discussed under heading 3 hereinbelow.

In FIG. 13 are shown three cases of the SFG dynamics when a linear sweep rate is applied. When a<<1, full frequency conversion is achieved as shown in FIG. 13a. When, the pump intensity is not high enough or the sweep rate at a given crystal length and pump intensity is not slow enough, then a>>1, and the conversion efficiency will drop, as seen in FIG. 13b. In the case a<<1, the pump intensity is small, or the sweep rate is extremely high. This corresponds to the weak coupling regime (the "unamplified signal approximation"), which results in low conversion efficiency, as shown in FIG. 13c. These dynamical trajectories can be projected on the W-axis of the sphere, bringing information regarding the conversion efficiency along the propagation, as shown in FIG. 1d. Also, their calculated Landau-Zener conversion efficiencies are presented to the right of each projected trajectory. Due to the importance of Eq. 2.2, we decided to present it in more practical parameters:

$$\eta_{LZ}(z \to \infty) = 1 - \exp\left(-\frac{2^5 \cdot 3^2 \cdot 10^{-3} \pi^2 (\chi^{(2)})^2 I_2}{n_1 n_2 n_3 \lambda_1 \lambda_3 c|d\Delta k/dz|}\right). \tag{5}$$

Here, c=3·10¹⁰ cm/sec, $\lambda_1$ and $\lambda_3$ are measured in cm, $I_2$ is measured in MW/cm², $X^{(2)}$ is measured in pm/V and |dΔk/dz| is measured in cm⁻².

3. EXPERIMENTAL SETUP AND RESULTS

Reference is now made to FIG. 14. In FIG. 14 (a) there is shown an adiabatic Sum frequency Conversion apparatus. The detection stage is designed to detect both an incoming $\omega_1$ beam, with an InGaAs detector, and the converted $\omega_3$ beam, with cooled CCD detection. In FIG. 14 (b) the linear relation is shown between the growth of the converted beam (measured by a cooled CCD spectrometer) and the decrease of the incoming beam (measured by an InGaAs detector), when increasing the pump intensity.

Although other implementations are possible, the simplicity and robustness of the quasi-phase matching technique in manipulating of the phase mismatch parameter, makes it the most attractive in terms of experimental realization. The desired value of the phase-mismatch parameter is obtained by tuning the spatial structure of the domains using the approximate relation:

$$\Delta k_\Lambda(z) = \frac{2\pi}{\Lambda(z)}$$

where Λ(z) is the local poling period.

By proper design of the periodicity of the poling, satisfying the adiabatic constraints posed by Eq. 3, an effective phase mismatch function was obtained, $$\Delta k_{eff}(z) = k_1(z) + k_2(z) - k_3(z) + \Delta k_\Lambda(z) = \Delta k_{proc}(z) + \Delta k_\Lambda(z). \quad (6)$$

Generally, for an aperiodic design it is reasonable to expand $\Delta k_\Lambda (z)$ in a power series:

$$\Delta k_\Lambda(z) = \Delta k_0 + \frac{\partial \Delta k}{\partial z} z + \frac{1}{2} \frac{\partial^2 \Delta k}{\partial z^2} z^2 + \ldots \frac{1}{N!} \frac{\partial^N \Delta k}{\partial z^N} z^N$$

For simplicity we chose to design the adiabatic aperiodically poled structure, with only two non-zero terms: the constant term, choosing $\Delta k_0 = -\Delta k_{proc}(z=L/2)$, and the linear term, $$\frac{\partial \Delta k}{\partial z}$$

chose to satisfy the adiabatic constraint posed by inequality 3. It may be noted that this simple design is not generally optimal in the sense of SFG bandwidth or temperature response. A more accurate solution for $\Delta k_\Lambda (z)$, may take into account the spectral dependence of $\Delta k_{proc} (z)$, due to dispersion, as well as the spectral variation of the coupling constant. In practice, in the near-mid IR regime, these higher order corrections are relatively small.

Figures 14A, 14B:
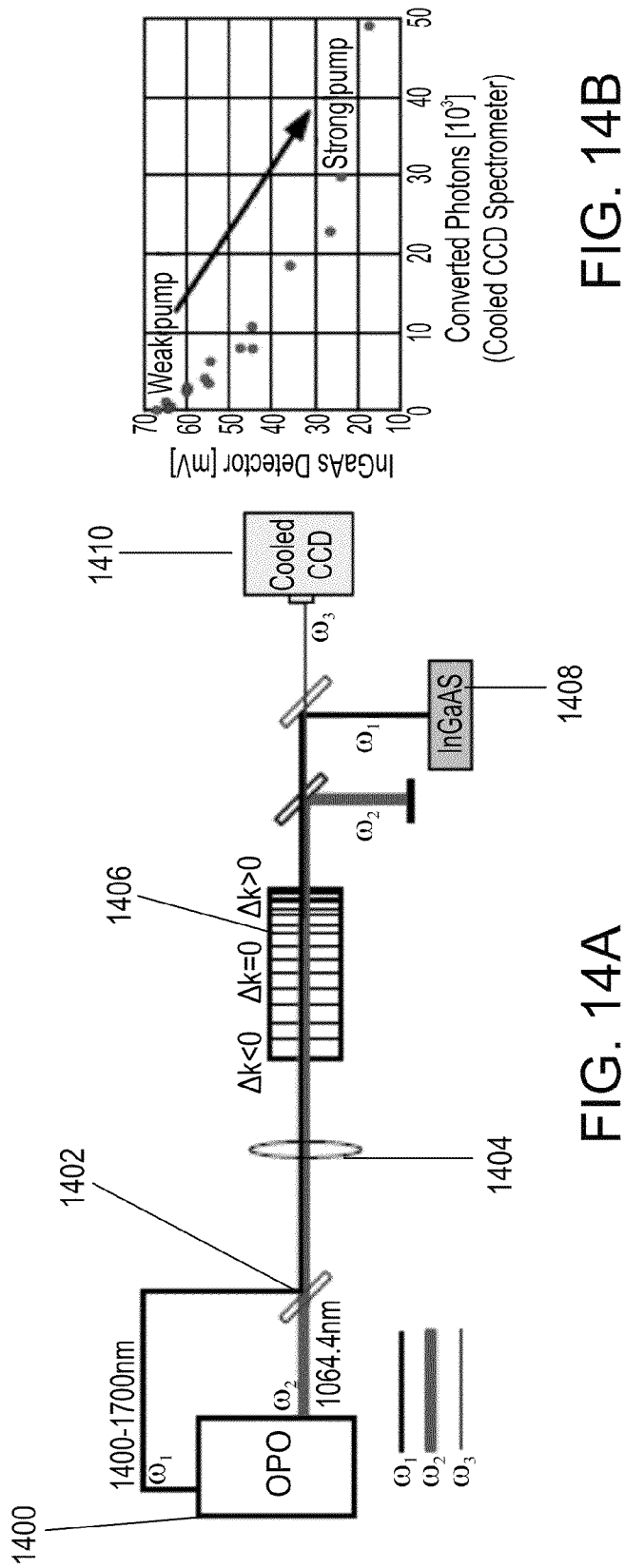
FIG. 14A is a simplified block diagram of an adiabatic sum frequency conversion apparatus including a crystal with a slowing changing poling periodicity according to a preferred embodiment of the present invention.
FIG. 14B is a graph showing the relationship of between growth of the converted beam and decrease of the incoming beam when increasing pump intensity using the apparatus of FIG. 14A.

The particular design used in the experiments was tested by numerical simulations of the propagation process using the finite difference method, where the periodicity was varied from 14.6 μm to 16.2 μm along a crystal length of L=20 mm. A plane wave approximation, and a nonlinear susceptibility $X^{(2)}=32$ pm/V were assumed. The experimental apparatus is as shown in FIG. 14a discussed above. We used an optical parametric oscillator (Ekspla NT342) 1400 as laser sources for both a strong pump at 1064 nm (6 ns, 130 μJ)—lower output, and a tunable signal—upper output—varying from 1400 nm to 1700 nm (5 ns, ≈1 μJ). The pump and the signal, both polarized in the extra-ordinary axis are spatially overlapped using beam mixer 1402 and focused collinearly using lens 1404 into adiabatic crystal 1406. The crystal has waists of 150 μm and 120 μm, respectively. These values guarantee that the Rayleigh range is larger than the crystal length and thus the plane wave approximation of our simulations holds. We collect both the input wavelength (signal) and output SFG wavelength (idler) after their propagation in the crystal and record them using InGaAs photodiode 1408, and a cooled CCD spectrometer 1410, respectively.

Our demonstration consists of several sets of experiments. In each set, we vary a different parameter of the process. In all the experiments, the conversion efficiency was measured by comparing the signal intensity with and without the presence of the pump beam. This was done after verifying that the increase of the converted beam, $A_3$, is correlated with the power loss of the incoming beam, $A_1$, as shown in FIG. 14b.

First, we measure the conversion efficiency as a function of the pump peak intensity for a fixed signal wavelength 1530 nm. The results are presented in FIG. 14b. A very good correspondence was obtained with the numerical simulation, where the maximal efficiency which was achieved with our maximal pump intensity was 74%±3%. It is noted that unlike the case of a phase-matched crystal, where the conversion efficiency oscillates between unity and zero upon increase in the pump intensity, the conversion efficiency remains near unity also for pump intensities exceeding 360 M W/cm².

In the second set of experiments, we measure the conversion efficiency as a function of the input wavelength, at a moderate pump intensity of 60 MW/cm². It is shown that an efficient ultra-broadband conversion of over 140 nm wide (1470 nm to 1610 nm) at room temperature may be obtained, except for the same small region of low efficiency around 1485 nm as in the previous experiment, which was associated with a local fabrication defect, leading to violation of the adiabacity condition at this wavelength)

Figures 15A, 15B:
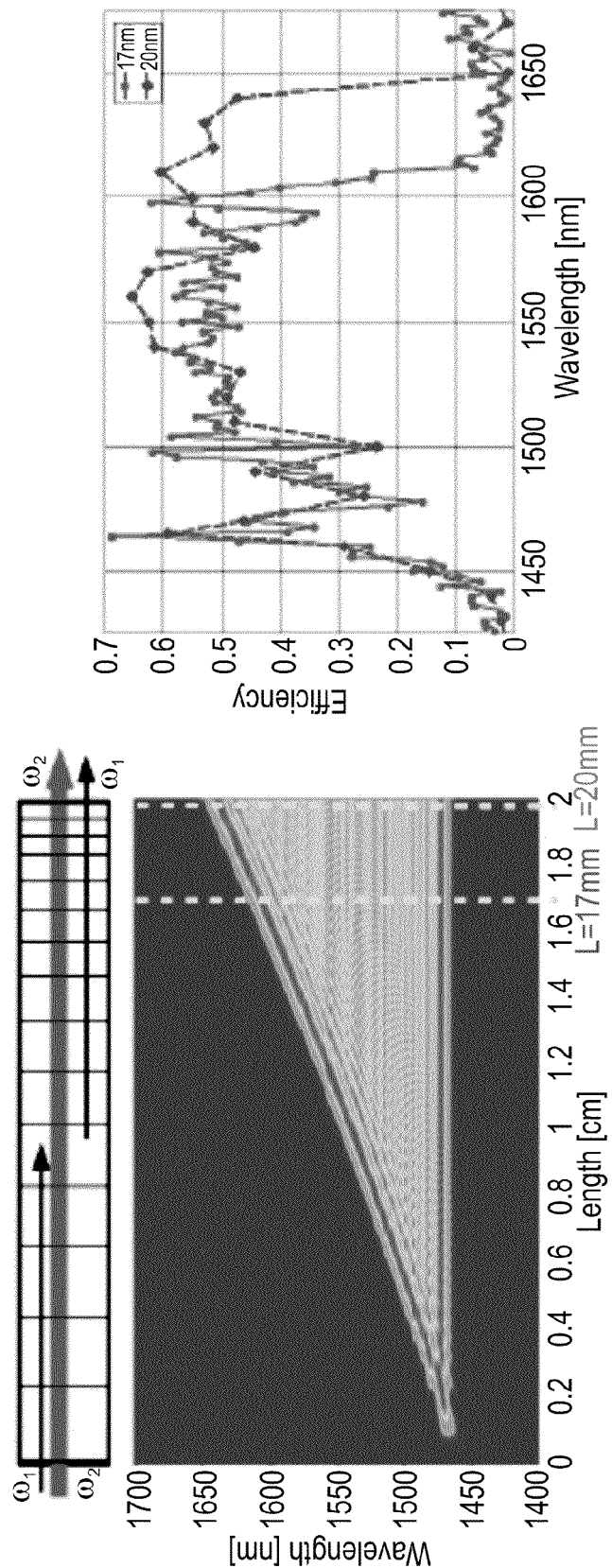
FIG. 15A shows conversion efficiency as a function of input wavelength and crystal length using the apparatus of FIG. 14A.
FIG. 15B shows experimental results of the spectral response for crystal lengths of 17 and 20 mm.

Reference is now made to FIG. 15 which shows conversion efficiency as a function of input wavelength and the crystal length. In FIG. 15(a) two dimensional numerical simulation of the conversion efficiency as a function of input wavelength (y axis), and propagation distance is shown. As seen, the shorter wavelengths are being converted early along the crystal, and the longer wavelengths are converted as the crystal length is increased. In FIG. 15(b) experimental results of the spectral response are shown for two different crystal lengths, 17 mm and 20 mm. By performing these measurements for two different lengths, 17 mm and 20 mm, of the same crystal, the robustness of the design of the present embodiment to variations in the crystal length is also demonstrated.

In a standard frequency converter, the use of thin crystals is required to achieve maximal bandwidth. However, in the adiabatic design of the present embodiments, the achieved bandwidth is expected to grow as the crystal length increases, while maintaining the same conversion efficiency. We show this both numerically and experimentally in FIG. 15. As can be seen, the efficient conversion bandwidth is increased almost linearly with the length of the crystals. This is in good agreement with the experimental results of FIG. 15b, which show a 30 nm wider bandwidth response as the crystal length increases by 3 mm. Two factors practically limit the achievable efficient conversion bandwidth. The first is absorption in the nonlinear crystal itself. Another limiting factor arises from the plane wave approximation which holds only if the crystal length is shorter than the apparatus Rayleigh range. The latter is, in practice, limited by the available pump energy.

This broad response can also be maintained by varying the temperature of the nonlinear crystal. This affects the conversion process both due to the temperature dependence of the crystal's refractive index, as well as through thermal expansion of the aperiodically poled structure. This secondary, but crucial, effect causes the expansion of the domains while increasing the temperature, effectively decreasing the phase mismatch parameter along the propagation. This leads to a weaker temperature response than that determined by the adiabatic design. In standard frequency conversion, temperature has a dramatic effect on the conversion efficiency and in fact, temperature tuning is commonly used to spectrally tune the narrow conversion bandwidth.

Figures 16A, 16B:
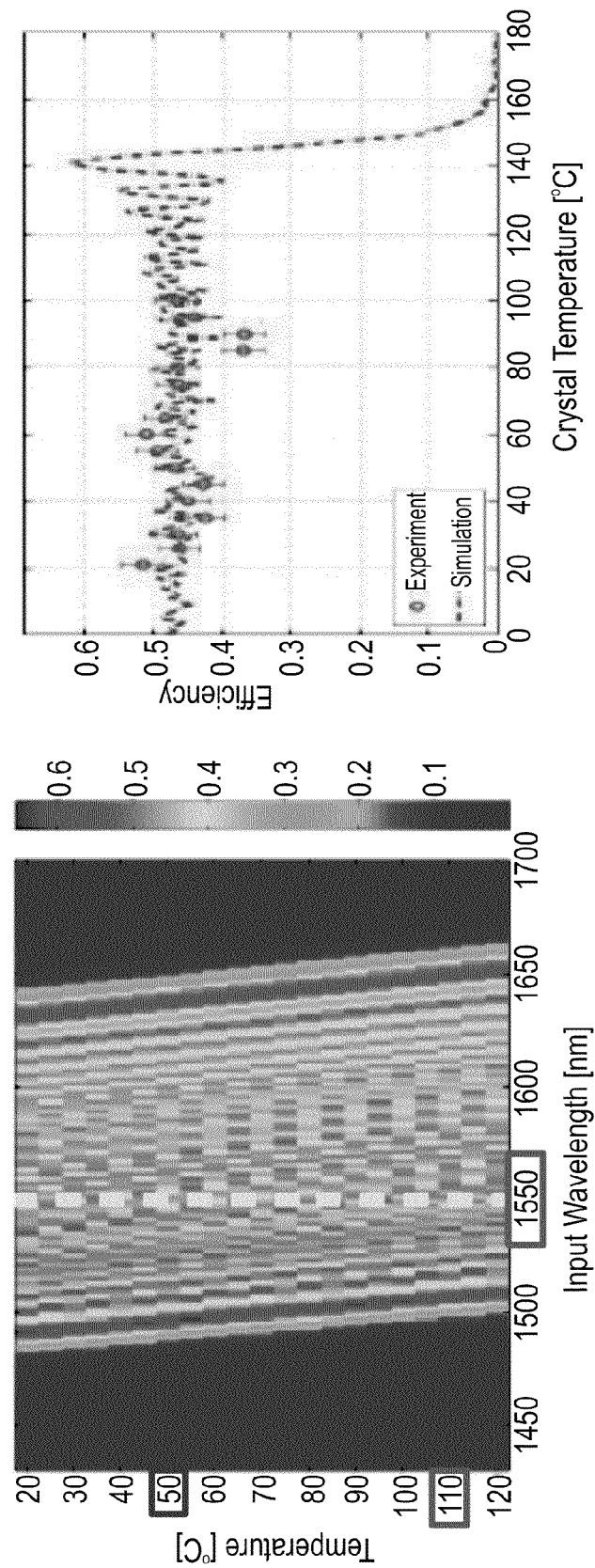
FIG. 16A shows conversion efficiency as a function of crystal temperature using and adiabatic periodically poled KTP crystal design at a pump intensity of 60 MW/cm2, where temperature and input wavelength are plotted on the two axes and color is used to encode the conversion efficiency.
FIG. 16B the conversion efficiency for the experimental setup in FIG. 16a but this time for a constant wavelength, and showing correspondence between experiment and simulation.

In contrast, for the adiabatic design, the conversion efficiency remains high even for large variation in the crystal temperature. Reference is now made to FIG. 16. which illustrates conversion efficiency as a function of crystal temperature, using the adiabatic aperiodically poled KTP design at a pump intensity of 60 MW=cm². FIG. 16(a) shows a two dimensional numerical simulation of the conversion efficiency as a function of crystal temperature (y-axis) and input wavelength. FIG. 16(b) shows conversion efficiency as a function of crystal temperature at constant input wavelength of $\omega_1$=1550 nm. A good correspondence (shown in solid red) between the experimental results and the simulation of the design (vertical cross section of the two dimensional simulation) is shown. In FIG. 16(a) we present a numerical simulation of the conversion efficiency as a function of the input wavelength and the temperature of the crystal. In the plot of FIG. 16(a), every vertical cross section represents the conversion efficiency as a function of crystal temperature for a constant wavelength. The experimental results are shown in FIG. 16(b), where the conversion efficiency at a constant wavelength of $\omega_1=1550$ nm as function of the crystal temperature is plotted. Highly efficient conversion is experimentally observed over a temperature range of over 80° C. The simulation, which contains the effect of thermal expansion, predicts that this range exceeds, in fact, the limit of the experiment. This is to be compared with an efficient range of 2° C. in the case of SFG in a phase matched crystal obtained by periodic poling.

Another parameter, which usually influences the phase mismatch is the incident angle of the incoming frequencies with the nonlinear crystal. We check, in simulations only, the robustness of the adiabatic design, and find out that the acceptance or input angle of the present design has increased from less than 5 degrees in the periodically poled structure to more than 25 degrees, for input wavelength of $\omega_1=1550$ nm, and crystal length of L=20 mm.

Last, we show that the adiabatic design is not only broad and robust, but that it can, for a given crystal design, also be tuned in a broad range. This is done by two separate mechanisms: temperature tuning and pump frequency tuning, enabling us to shift the efficient conversion band to lower or higher input frequencies. Reference is now made to FIG. 17 which illustrates tunability of the broad bandwidth response. FIG. 17 (a) shows experimental results of temperature tunability, at a pump intensity of 60 MW/cm² including conversion efficiency. FIG. 17(b) shows numerical simulations of pump wavelength tunability.

Thus in FIG. 17(a), we plot the measured conversion efficiency as a function of input wavelength for two crystal temperatures: 50° C. and 110° C. As can be seen, the efficient conversion band is redshifted by ≈50 nm, which is in good correspondence with the numerical simulations shown as horizontal cross sections in FIG. 16.

An even more dramatic effect is presented in FIG. 17(b), where the effect of changing the pump wavelength is simulated. In the figure we compare the response of the present adiabatic design pumped at 1064 nm (as in the experiments) with the response to a pump wavelength of 1047 nm (pumping with a Nd:YLF laser), and pump wavelength of 1159 nm, which can be readily obtained by raman shifting the 1064 nm excitation beam, in a Raman shifter.

In both tuning mechanisms, we see that as the efficient conversion band is tuned to lower wavelengths, the conversion efficiency slightly increases and the response becomes slightly narrower.

Tuning to the higher wavelength leads to the opposite behavior. The change in conversion efficiency is a direct outcome of the fact that the coupling coefficient has been changed (decreased or increased, respectively), mainly through its dependence on the characteristics of the pump. This effectively changes the adiabatic parameter, and thus the conversion efficiency. The narrowing or broadening of the spectral response merely reflects the constant bandwidth in frequency.

4. CONCLUSION

In this latter embodiment we analyze the robustness of the adiabatic sum frequency generation scheme. We show that it exhibits efficient conversion for wide range of frequencies and temperatures, up to two orders of magnitude larger than a standard phase matched nonlinear crystal. The results show that a tradeoff between a broad bandwidth response and conversion efficiency is not always required, and can be limited to the cases of either a weak pump intensity, or fast changes in phase-mismatch parameter. With an adiabatic design, nearly complete frequency conversion can be achieved, without the necessity of perfect phase matching along the entire propagation.

We introduce an analytical tool, the Landau-Zener conversion efficiency formula, which may estimate the degree of the adiabatic propagation along the SFG process. The robustness of this design for other parameters is discussed. Among them we explore its robustness to pump intensity, crystal length and acceptance angle variations. We also demonstrate the tunabilty of the broad spectral response via changes of crystal temperature and pump wavelength. This tunability mechanism could have a great impact on the applicability of such devices.

The adiabatic scheme can be utilized with some care to efficiently upconvert broadband fluorescence signal as well as ultrashort pulses. The present scheme is also highly relevant to spectroscopy of incoherent signals, such as is commonly utilized in astronomy, material science and molecular spectroscopy. Due to the lack of quantum efficient detectors in the mid IR and far IR optical regimes, optically up-converted weak signals into the near IR and visible regimes is often used to facilitate quantum limited detection.

The complete analogy with two level physics and its geometrical visualization, which is ubiquitous in other physical realms, could bring new physical insights into the process of frequency conversion and may lead to better understanding of other nonlinear optical processes.

A crystal according to the present embodiments may have applications in signal processing, or indeed any optical regime, where message bearing signals may be modulated such as not to have a sharp spectrum, or may indeed be frequency modulated. Furthermore a multiplexed channel may comprise numerous messages over a range of frequencies.

The efficiency of the frequency conversion may be related by a square law to the $\chi^{(2)}$ quality of the crystal, so doubling the $\chi^{(2)}$ quality provides four times the efficiency and allows a four times reduction in the pump laser intensity. This follows from the definition of Kappa in equations 4 and 5 of the first section above, and its relation to the pump intensity.

Additional applications may include an enhancement for sensing devices. An optical sensor may be sensitive in a particular spectral range which is not the same as the spectral range providing the most information in a particular scene. A frequency shift device able to operate over a range of frequencies could translate the scene into a range more suitable for the available sensor. Clearly if the input is a non-coherent source and thus lacks intensity, the efficiency becomes an issue in obtaining a reasonable output.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A crystal for wavelength conversion, the crystal having a longitudinal dimension between a first end and a second end and having a periodic pole structure comprising a plurality of tuned periods, wherein tuning of respective periods comprises providing a strong negative mismatch to an incoming light frequency for conversion at said first end and a strong positive mismatch to said frequency at said second end, and varying adiabatically along said longitudinal dimension from said first end to said second end, said varying adiabatically comprising providing phase mismatch via a gradual change in said tuned periods along the length of the crystal.

2. The crystal of claim 1, being a quasi-phase matched crystal.

3. The crystal of claim 2, wherein said adiabatic variation is continuously incremental along said dimension.

4. The crystal of claim 1, configured to be used with a laser pump beam at an intensity sufficient to allow the undepleted pump approximation to apply.

5. The crystal of claim 1, wherein said tuning comprises a strong positive mismatch to an incoming light frequency at said first end and a strong negative mismatch to said frequency at said second end.

6. The crystal of claim 5, configured to provide to incident light a group of at least one period with a first tuning, followed by succeeding groups of at least one period, each with marginal changes in said tuning compared to a respective preceding group.

7. The crystal of claim 1, wherein each period has a period length within an order of magnitude of a wavelength of light of interest.

8. The crystal of claim 1, having a length along said longitudinal dimension of substantially seven orders of magnitude of said wavelength.

9. The crystal of claim 1, wherein said tuning is provided as a length of a respective period.

10. The crystal of claim 1, wherein said adiabatic varying comprises a change that is sufficiently gradual compared to an internal square of coupling between corresponding propagating light beams.

11. Apparatus for efficient broadband wavelength conversion comprising:
    a crystal having a physical parameter with a phase mismatch changed adiabatically over a length of said crystal, the crystal comprising a strong negative mismatch to an incoming light frequency for conversion at said first end and a strong positive mismatch to said frequency at said second end, said varying adiabatically comprising a gradual change in said phase mismatch along the length of the crystal;
    a coherent source input for receiving source light at an input frequency within a frequency range;
    a pump laser input for receiving laser light at a predetermined pump frequency; and
    an output for outputting light at an output frequency, said output frequency being a function of said input frequency and said pump frequency.

12. The apparatus according to claim 11, wherein said crystal is constructed to be a non-linear crystal.

13. The apparatus of claim 12, wherein said non-linear crystal is constructed to be quasi-phase matched.

14. The apparatus of claim 11, wherein said phase mismatch comprises locating said crystal within a temperature gradient from a first end of the crystal to a second end thereof.

15. The apparatus of claim 11, wherein said crystal has a first end and a second end and said adiabatic change comprises a change between a highly positive mismatch to a highly negative mismatch between said first end and said second end.

16. The apparatus of claim 11, wherein said function comprises a summation function.

17. The apparatus of claim 11, wherein said function comprises a difference function.

18. The apparatus of claim 11 wherein said pump laser input provides laser light at an intensity substantially high enough to justify the undepleted pump approximation.

19. The apparatus of claim 18, wherein the pump laser provides light over a relatively narrow frequency range.

20. A method of manufacturing a crystal for wavelength conversion comprising:
    growing said crystal from a first end to a second end with a progression of layers of oppositely polarized regions between said first and second ends, and providing a strong negative mismatch to an incoming light frequency for conversion at said first end and a strong positive mismatch to said frequency at said second end;
    gradually changing a property of said layers along progression, thereby forming an adiabatically changing quasi-matched non-linear crystal, said property gradually changing comprising respective phase mismatches of a plurality of tuned periods along the length of the crystal.

21. The method of claim 20, wherein said property comprising respective phase mismatches is a layer thickness.

* * * * *